US012790880B2

(12) United States Patent
Langenberg et al.

(10) Patent No.: US 12,790,880 B2
(45) Date of Patent: Nov. 10, 2026

(54) POWERED OPENING MODULE FOR A DOOR CLOSER

(71) Applicant: Schlage Lock Company LLC, Carmel, IN (US)

(72) Inventors: Daniel Langenberg, Zionsville, IN (US); Jason Fodstad, Zionsville, IN (US); Adithya Gangadhar Shetty, Bangalore (IN); John A. Wolfe, Cicero, IN (US); David V. Toloday, Martinsville, IN (US)

(73) Assignee: Schlage Lock Company LLC, Carmel, IN (US)

(*) Notice: Subject to any disclaimer, the term of this patent is extended or adjusted under 35 U.S.C. 154(b) by 72 days.

(21) Appl. No.: 18/816,958

(22) Filed: Aug. 27, 2024

(65) Prior Publication Data

US 2025/0198220 A1 Jun. 19, 2025

Related U.S. Application Data

(60) Continuation of application No. 18/203,374, filed on May 30, 2023, now Pat. No. 12,071,803, which is a (Continued)

(51) Int. Cl.
*E05F 15/70* (2015.01)
*E05F 15/614* (2015.01)
(Continued)

(52) U.S. Cl.
CPC ............ *E05F 15/73* (2015.01); *E05F 15/614* (2015.01); *E05F 1/00* (2013.01); *E05Y 2201/434* (2013.01);
(Continued)

(58) Field of Classification Search
CPC . E05F 15/73; E05F 15/614; E05F 3/22; E05F 1/00; E05F 1/10; E05Y 2400/40;
(Continued)

(56) References Cited

U.S. PATENT DOCUMENTS 4,501,090 A 2/1985 Yoshida et al.
5,878,530 A 3/1999 Eccleston et al.
(Continued)

FOREIGN PATENT DOCUMENTS

WO 2011130643 A1 10/2011
WO 2021119596 A1 6/2021

OTHER PUBLICATIONS

European Examination Report; European Patent Office; European Patent Application No. 21813714.9; Aug. 26, 2025; 5 pages.
(Continued)

*Primary Examiner* — Chi Q Nguyen
(74) *Attorney, Agent, or Firm* — Taft Stettinius & Hollister LLP

(57) ABSTRACT

A retrofit module configured for use with a door closer having a pinion. The retrofit module generally includes a case, an output shaft, a motor, and a control assembly. The output shaft is rotatably mounted in the case, and is configured for rotational coupling with the pinion. The motor is mounted to the case, and is operable to rotate the output shaft in a door-opening direction. The control assembly is mounted to the case, and is configured to operate the motor to drive the output shaft in the door-opening direction in response to an actuating signal.

20 Claims, 13 Drawing Sheets

Related U.S. Application Data division of application No. 17/225,615, filed on Apr. 8, 2021, now Pat. No. 11,661,786.

(60) Provisional application No. 63/030,680, filed on May 27, 2020.

(51) Int. Cl.
*E05F 15/73* (2015.01)
*E05F 1/00* (2006.01)

(52) U.S. Cl.
CPC ..... *E05Y 2201/716* (2013.01); *E05Y 2400/32* (2013.01); *E05Y 2400/40* (2013.01); *E05Y 2400/61* (2013.01); *E05Y 2400/66* (2013.01); *E05Y 2400/85* (2013.01); *E05Y 2400/8515* (2024.05); *E05Y 2600/46* (2013.01); *E05Y 2600/51* (2013.01); *E05Y 2800/70* (2013.01); *E05Y 2900/132* (2013.01)

(58) Field of Classification Search
CPC ............. E05Y 2400/66; E05Y 2600/46; E05Y 2900/132; E05Y 2800/70; E05Y 2201/716; E05Y 2400/85; E05Y 2600/51; E05Y 2400/61; E05Y 2201/434; E05Y 2400/32; E05Y 2400/8515
See application file for complete search history.

(56) References Cited

U.S. PATENT DOCUMENTS

| | | | | |
|---|---|---|---|---|
| 5,881,497 | A | 3/1999 | Borgardt | |
| 6,006,475 | A * | 12/1999 | Schwantes | E05F 15/63 49/140 |
| 6,588,153 | B1 * | 7/2003 | Kowalczyk | E05F 15/63 49/340 |
| 6,634,140 | B1 | 10/2003 | Sellman | |
| 6,667,591 | B2 | 12/2003 | Mullet et al. | |
| 6,891,479 | B1 | 5/2005 | Eccleston | |
| 7,034,486 | B1 | 4/2006 | McMahon | |
| 7,298,107 | B2 | 11/2007 | McMahon | |
| 7,316,096 | B2 | 1/2008 | Houser et al. | |
| 7,339,336 | B2 | 3/2008 | Gregori | |
| 7,679,301 | B2 | 3/2010 | Gregori et al. | |
| 7,855,475 | B2 | 12/2010 | Fitzgibbon | |
| 8,109,038 | B2 * | 2/2012 | Houser | E05F 15/63 49/340 |
| 8,169,169 | B2 | 5/2012 | Hass et al. | |
| 8,390,219 | B2 * | 3/2013 | Houser | E05F 15/63 318/400.38 |
| 8,405,337 | B2 | 3/2013 | Gebhart et al. | |
| 8,867,630 | B2 * | 10/2014 | Langenberg | H04B 3/54 375/220 |
| 8,978,379 | B2 | 3/2015 | Gotoh | |
| 9,284,768 | B2 | 3/2016 | Sasaki | |
| 9,523,230 | B2 | 12/2016 | Burris et al. | |
| 9,574,389 | B2 | 2/2017 | Menze et al. | |
| 10,316,568 | B2 * | 6/2019 | Langenberg | E05F 3/22 |
| 10,844,644 | B2 * | 11/2020 | Langenberg | E05F 3/22 |
| 10,947,764 | B2 * | 3/2021 | Langenberg | E05F 1/10 |
| 10,995,534 | B1 | 5/2021 | Dixon et al. | |
| 11,142,939 | B2 * | 10/2021 | Plummer | E05F 3/224 |
| 11,434,682 | B2 | 9/2022 | Sellinger et al. | |
| 11,519,212 | B2 | 12/2022 | Lacy et al. | |
| 11,560,745 | B2 * | 1/2023 | Langenberg | E05F 1/10 |
| 11,661,786 | B2 | 5/2023 | Langenberg et al. | |
| 11,851,932 | B2 | 12/2023 | Fava et al. | |
| 11,878,287 | B2 | 1/2024 | Ali et al. | |
| 11,920,399 | B2 | 3/2024 | Sellinger et al. | |
| 12,071,803 | B2 * | 8/2024 | Langenberg | E05F 15/614 |
| 12,516,561 | B2 * | 1/2026 | Sorice | E05B 47/02 |
| 12,546,158 | B2 * | 2/2026 | Seadia | E05F 15/70 |
| 2009/0093913 | A1 | 4/2009 | Copeland, II et al. | |
| 2009/0265992 | A1 | 10/2009 | Hass et al. | |
| 2011/0094160 | A1 | 4/2011 | Houser et al. | |
| 2015/0368954 | A1 | 12/2015 | Ressel et al. | |
| 2016/0362928 | A1 | 12/2016 | Menze et al. | |
| 2017/0159344 | A1 | 6/2017 | Langenberg et al. | |
| 2018/0334841 | A1 | 11/2018 | Langenberg et al. | |
| 2019/0024438 | A1 | 1/2019 | Budd et al. | |
| 2019/0360255 | A1 | 11/2019 | Ozaki et al. | |
| 2020/0165857 | A1 | 5/2020 | Yulkowski | |
| 2020/0173222 | A1 | 6/2020 | Budd et al. | |
| 2021/0025215 | A1 | 1/2021 | Sellinger et al. | |
| 2023/0031967 | A1 | 2/2023 | Wolfe | |

OTHER PUBLICATIONS

CA Examination Report; Canadian Intellectual Property Office; Canadian Application No. 3,180,604; Jul. 10, 2025; 4 pages.
AU Examination Report No. 2, IP Australia, Australian Patent Application No. 202128182, Apr. 4, 2024, 5 pages.
International Search Report; International Searching Authority; International Application No. PCT/US2021/034207; Sep. 9, 2021; 2 pages.
Written Opinion; International Searching Authority; International Application No. PCT/US2021/034207; Sep. 9, 2021; 9 pages.
AU Examination Report; IP Australia; Australian Patent Application No. 202128182, Feb. 23, 2024, 4 pages.
Extended European Search Report; European Patent Office; European Patent Application No. 21813714.9; Oct. 20, 2023; 7 pages.
Australian Examination Report No. 1; IP Australia; Australian Patent Application No. 2025203990; May 20, 2026; 6 pages.
Australian Examination Report No. 2; IP Australia; Australian Patent Application No. 2025203990; Jun. 10, 2026; 4 pages.
CA Examination Report; Canadian Intellectual Property Office; Canadian Patent Application No. 3,180,604; Jul. 22, 2026; 4 pages.

* cited by examiner

POWERED OPENING MODULE FOR A DOOR CLOSER

CROSS-REFERENCE TO RELATED APPLICATIONS

The present application is a continuation of U.S. patent application Ser. No. 18/203,374 filed May 30, 2023 and issued as U.S. Pat. No. 12,071,803, which is a divisional of U.S. patent application Ser. No. 17/225,615 filed Apr. 8, 2021 and issued as U.S. Pat. No. 11,661,786, which claims the benefit of U.S. Provisional Patent Application No. 63/030,680 filed May 27, 2020, the contents of each application are incorporated by reference in their entirety.

TECHNICAL FIELD

The present application generally relates to door operators, and more particularly but not exclusively relates to a retrofit module configured for use with conventional hydraulic door closers.

BACKGROUND

Recently, there has been an increased awareness in public health and discouraging the transmission of pathogens through commonly-touched surfaces, such as doors. While many door installations are provided with hydraulic door closers that aid in closing the door, these door closers are typically not configured to provide for powered opening of the door. As such, these door surfaces are frequently touched by many users, which may facilitate the transmission of pathogens. While certain types of door opening systems exist, these systems are typically provided as replacements for existing door closers, and are often expensive and time-consuming to install. For these reasons among others, there remains a need for further improvements in this technological field.

SUMMARY

Certain embodiments of the present application relate to a retrofit module configured for use with a door closer comprising a pinion. The retrofit module generally includes a case, an output shaft, a motor, and a control assembly. The output shaft is rotatably mounted in the case, and is configured for rotational coupling with the pinion. The motor is mounted to the case, and is operable to rotate the output shaft in a door-opening direction. The control assembly is mounted to the case, and is configured to operate the motor to drive the output shaft in the door-opening direction in response to an actuating signal.

DETAILED DESCRIPTION OF ILLUSTRATIVE EMBODIMENTS

Figure 1:
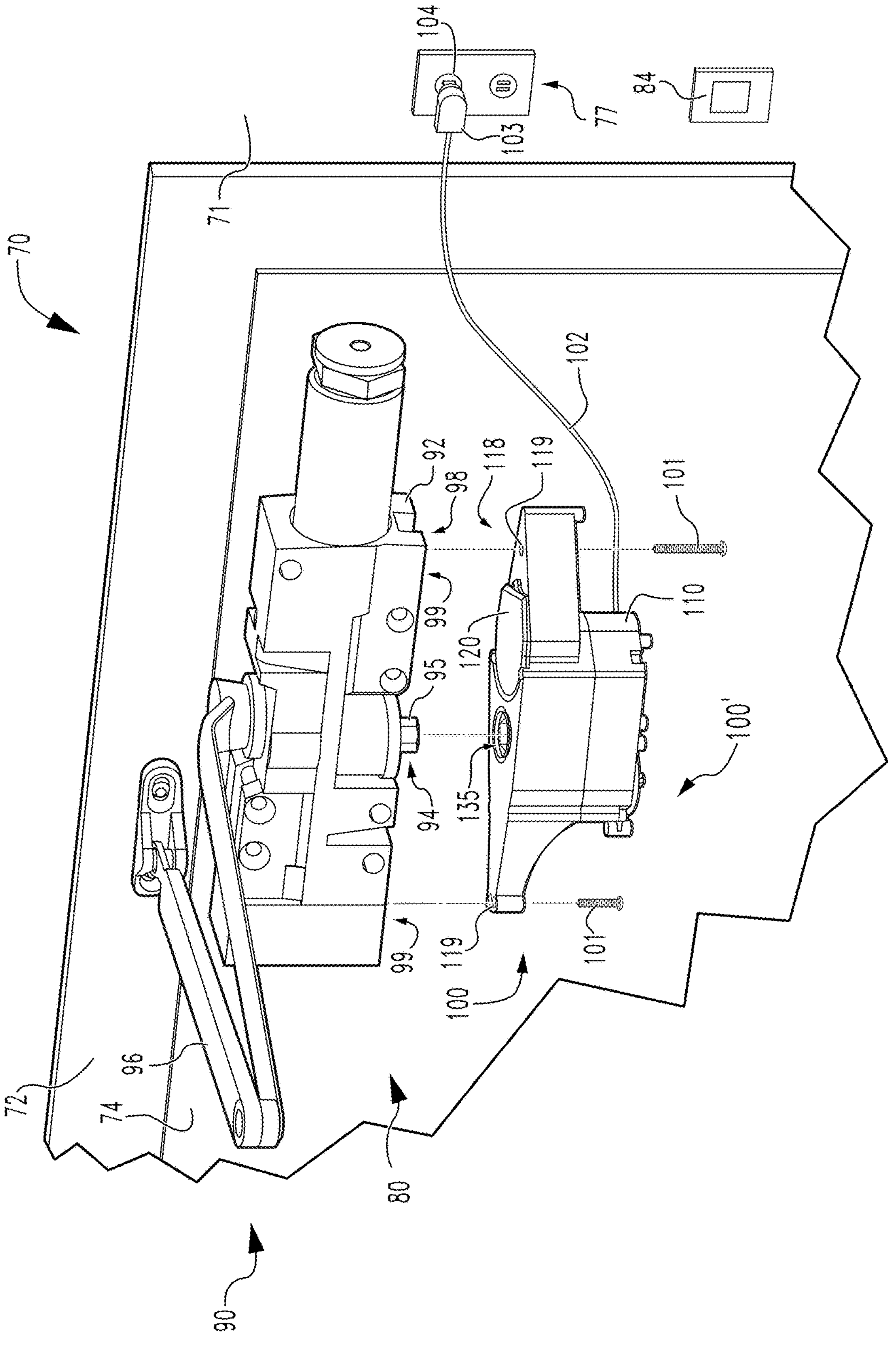
FIG. 1 illustrates a closure assembly according to certain embodiments, including a door closer and a powered opening module according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, need not be included or may be combined with other features.

As used herein, the term "about" may be used to modify a quantitative representation, and indicates a margin of +/−10%. For example, a voltage that is described as "about 24 volts" indicates that the voltage in question may fall within the range of 21.6 volts to 26.4 volts.

With reference to FIG. 1, illustrated therein is a closure assembly 70 according to certain embodiments. The closure assembly 70 generally includes a door frame 72 and a door 74 swingingly mounted to the frame 72, for example by one or more hinges 73. The closure assembly 70 further includes a door operator system 80 according to certain embodiments. The door operator system 80 generally includes a traditional door closer 90 and a powered opening module 100 according to certain embodiments.

The door closer 90 generally includes a closer body 92, a pinion 94 rotatably mounted to the body 92, and an armature 96 connected with the pinion 94. The body 92 is mounted to one of the frame 72 or the door 74, and the armature 96 is connected between the pinion 94 and the other of the frame 72 or the door 74. In the illustrated form, the body 92 is mounted to the door 74, and the armature 96 is connected between the pinion 94 and the frame 72. In other embodiments, the body 92 may be mounted to the frame 72, and the armature 96 may be connected between the pinion 94 and the door 74. The closer body 92 includes a closer body mounting pattern 98 that includes at least one mounting location 99, which facilitates mounting of the module 100 to the closer body 92 as described herein.

During operation of the door closer 90, opening of the door 74 is correlated with rotation of the pinion 94 in a door-opening direction, and closing of the door 74 is correlated with rotation of the pinion 94 in a door-closing direction opposite the door-opening direction. Additionally, the closer 90 is configured to generate a biasing force urging the pinion 94 in the door-closing direction such that the closer 90 urges the door 74 toward its closed position. For example, the closer 90 may include a rack gear engaged with the pinion 94 and a spring engaged with the rack gear. In such forms, opening of the door 74 drives the pinion 94 in the door-opening direction, thereby shifting the rack gear in a first direction and compressing the spring. During closing of the door 74, the spring expands, thereby driving the rack gear in a second direction opposite the first direction and urging the pinion 94 in the door-closing direction, thereby urging the door 74 toward its closed position. The closer 90 may further include one or more hydraulic passages through which a hydraulic fluid flows to modulate the opening and/or closing speed of the door 74. Door closers of this type are known in the art, and need not be described in detail herein.

Figure 2:
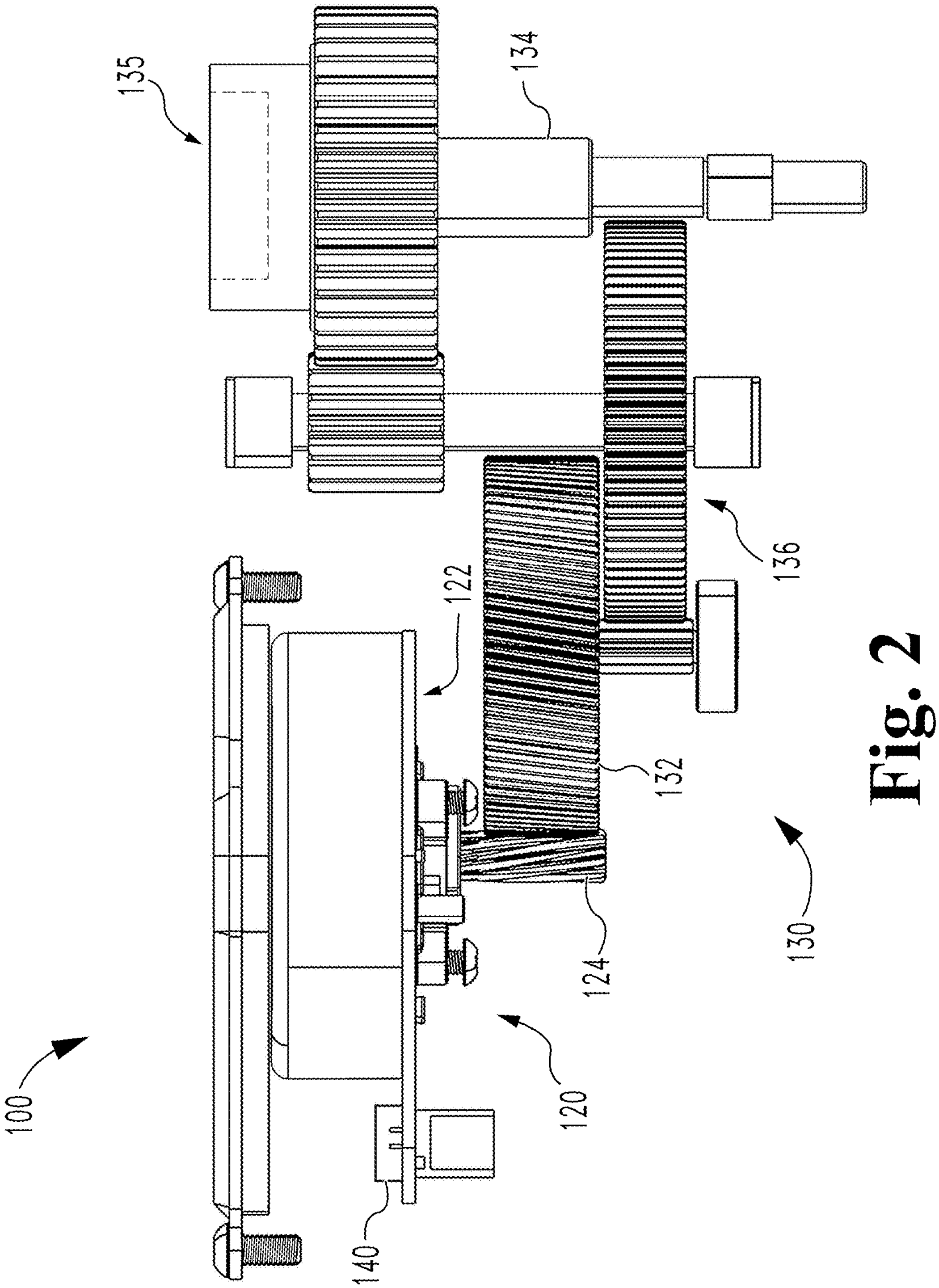
FIG. 2 illustrates a portion of the powered opening module illustrated in FIG. 1.

With additional reference to FIG. 2, the powered opening module 100 generally includes a case 110, a motor 120 mounted in the case 110, a gear train 130 operably connected with the motor 120, and a control assembly 140 in communication with the motor 120. As described herein, the powered opening module 100 is configured to generate a force that urges the pinion 94 in the door-opening direction to at least assist in the opening of the door 74. In certain embodiments, one or more components of the powered opening module 100 may be substantially similar to corresponding components described in U.S. patent application Ser. No. 16/040,765, filed Jul. 20, 2018, the contents of which are incorporated by reference in their entirety.

The module case 110 houses the internal components of the module 100, and includes an opening operable to receive an end portion of the pinion 94. The case 110 is configured for mounting to at least one of the closer body 92, the frame 72, or the door 74. In the illustrated form, the module case 110 is configured for mounting to the closer body 92. Additionally or alternatively, the module case 110 may be configured for mounting to the door 74. In certain embodiments, such as those in which the closer body 92 is mounted to the frame 72, the module case 110 may likewise be configured for mounting to the frame 72. In the illustrated embodiment, the case 110 includes a case mounting pattern 118 that includes at least one mounting aperture 119, and which corresponds to the closer body mounting pattern 98 such that the mounting aperture(s) 119 are operable to align with the mounting locations 99. When so aligned, fasteners such as bolts 101 may be utilized to secure the case 110 to the closer body 92.

The motor 120 is mounted in the case 110, is drivingly connected with the gear train 130, and is in communication with the control assembly 140 such that the control assembly 140 is operable to control operation of the motor 120. The motor 120 includes a body portion 122 and a motor shaft 124 that is rotated by the body portion 122 under control of the control assembly 140. The motor shaft 124 is engaged with the gear train 130 such that rotation of the motor shaft 124 causes a corresponding rotation of the gear train 130. In certain embodiments, the motor 120 may, for example, be provided as a DC brushless motor. It is also contemplated that the motor 120 may be provided in another form, such as that of a brushed motor or a stepper motor. The motor 120 is operable to rotate the motor shaft 124 in at least a first direction, and may be further operable to rotate the motor shaft 124 in a second direction opposite the first direction. As described herein, rotation of the motor shaft 124 in the first direction is correlated with opening of the door 74, and rotation of the motor shaft 124 in the second direction is correlated with closing of the door 74.

The gear train 130 is movably mounted in the case 110 and is engaged with the motor 120 such that the motor 120 is operable to drive the gear train 130. The gear train 130 includes an input gear 132 engaged with the motor shaft 124 and an output shaft 134 engaged with the input gear 132 such that rotation of the motor shaft 124 is correlated with rotation of the output shaft 134. For example, the input gear 132 may be operably connected with the output shaft 134 via one or more additional gears 136. In the illustrated form, the gear train 130 is provided as a reduction gear set that provides the output shaft 134 with a greater torque and a lower speed than is provided to the motor shaft 124 by the motor 120. It is also contemplated that the gear train 130 may be provided in another form, or may be omitted (e.g., in embodiments in which the motor 120 directly rotates the output shaft 134).

The output shaft 134 includes a pinion interface 135 sized and shaped to receive an exposed end portion 95 of the pinion 94 for rotational coupling of the output shaft 134 with the pinion 94. For example, in embodiments in which the end portion 95 of the pinion 94 has a generally hexagonal outer geometry, the pinion interface 135 may have a corresponding hexagonal inner geometry sized and shaped to matingly receive the exposed end portion 95 of the pinion 94. When the module 100 is mounted to the closer 90, the pinion 94 and the output shaft 134 are coupled for joint rotation such that rotation of the motor shaft 124 is correlated with rotation of the pinion 94. More particularly, rotation of the motor shaft 124 in the first direction is correlated with rotation of the pinion 94 in the door-opening direction, and rotation of the motor shaft 124 in the second direction is correlated with rotation of the pinion 94 in the door-closing direction. As such, the first direction for the motor shaft 124 may alternatively be referred to as the opening direction, and the second direction for the motor shaft 124 may alternatively be referred to as the closing direction.

Figure 3:
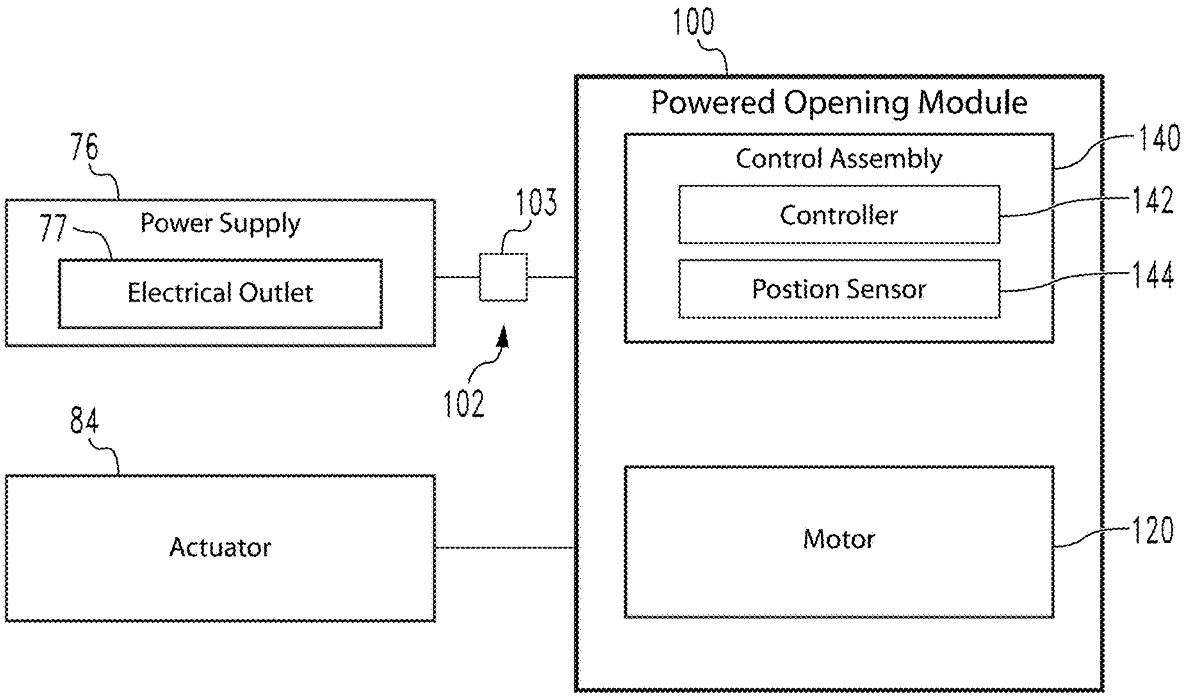
FIG. 3 is a schematic block diagram of the closure assembly illustrated in FIG. 1.

With additional reference to FIG. 3, the control assembly 140 is in communication with the motor 120 and an actuator 84, and is operable to control operation of the motor 120 based upon information received from the actuator 84 using power drawn from an electrical power supply 76. In certain embodiments, the power supply 76 may be provided as an onboard power supply, such as one or more batteries. In other embodiments, the power supply 76 may be an external power supply, such as line power. For example, the module 100 may be provided with a cord 102 including a plug 104 that is plugged into a standard power outlet 77 in the vicinity of the door 74, where the power outlet 77 serves the function of the power supply 76. The cord 102 may include an adapter 103 that converts the line power to a power suitable for use by the module 100, such as about 24 volts (e.g., 24 volts+/−10%). As described herein, the module 100 may be configured to operate under such reduced voltages, which may obviate the need for a skilled electrician installer by enabling the cord 102 to be plugged into a standard electrical outlet. In certain embodiments, the module 100 may be configured to receive electrical power and/or command signals via a Power-over-Ethernet connection.

As noted above, the control assembly 140 is in communication with the actuator 84, and is configured to control operation of the motor 120 based upon information received from the actuator 84. More particularly, the actuator 84 is operable to transmit to the control assembly 140 an actuating signal in response to an actuating input provided by a user, and the control assembly 140 is configured to power the motor 120 to open the door 74 in response to receiving the actuating signal. In certain embodiments, the actuator 84 may be in wired communication with the control assembly 140. Additionally or alternatively, the actuator 84 may be in wireless communication with the control assembly 140. In certain forms, the actuator 84 may be mounted to the door 74 or in the vicinity of the door 74 (e.g., within 12 to 60 inches of the door 74) such as on a wall 71 adjacent the door 74. As described herein, in certain embodiments, the actuator 84 may be provided with the powered opening module 100 in a retrofit kit 100' for an existing closure assembly. In certain forms, the actuator 84 may be provided in the form of a credential reader. In certain forms, the actuator 84 may be provided as a non-credentialed actuator.

In certain forms, the actuator 84 may be activated by touch. For example, the actuator 84 may be provided in the form of a pushbutton that transmits the actuating signal when depressed, or a touchpad that transmits the actuating signal when touched. In certain forms, the actuator 84 may be mounted at a height that facilitates touching by the hands of a user, such as between 34 and 48 inches above floor level. It is also contemplated that the actuator 84 may be mounted at a height that facilitates actuation by foot, such as less than 24 inches above floor level.

It is also contemplated that the actuator 84 may be provided as a touchless actuator, such as a motion sensor or passive infrared sensor. In certain embodiments, a touchless form of the actuator 84 may be mounted to the case 110 and configured to transmit the actuating signal in response to the approach of a user. In certain embodiments, a touchless form of the actuator 84 may be mounted to the door 74 or in the vicinity of the door 74 (e.g., within 12 to 60 inches of the door 74) and configured to generate the actuating signal when a user waves an appendage (e.g., a hand or foot) in front of the actuator 84.

The control assembly 140 generally includes control circuitry such as a controller 142, and may further include a position sensor 144 configured to sense a rotational position of the output shaft 134. As should be appreciated, the control assembly 140 may further include additional components, such as power conditioning circuitry configured to convert the power received from the power supply 76 to a form usable by the motor 120. As described herein, the controller 142 is configured to control operation of the motor 120 such that the powered opening module 100 generates a doo-opening torque urging the pinion 94 in the door-opening direction to at least assist in opening the door 74 when a user actuates the actuator 84.

In embodiments that include the position sensor 144, the position sensor 144 may be configured to sense the rotational position of the output shaft 134, and thus the rotational position of the pinion 94. In certain embodiments, the position sensor 144 may, for example, be provided in the form of a rotary encoder. It is also contemplated that the position sensor 144 may be provided in another form, such as that of an absolute position sensor or a switch. In certain forms, the controller 142 may be operable to determine when the door 74 has reached a desired position (e.g., a fully open position) based upon information received from the position sensor 144, and may control operation of the motor 120 based at least in part upon the information received from the position sensor 144.

During operation of the closure assembly 70, the door 74 is biased toward its closed position by the conventional door closer 90. When a user approaches the closure assembly 70, the presence of the user may be detected by the actuator 84. Depending on the form of the actuator 84, the actuator 84 may detect the user in a touchless fashion (e.g., by detecting the presence of the user or the waving of a hand or foot), or may detect the presence of the user in response to being physically acted upon by the user (e.g., by the user depressing a button of the actuator 84). Regardless of the manner in which the actuator 84 detects the presence of the user, the actuator 84 may transmit the actuating signal in response to detecting the user and/or the user's intent to open the door 74.

Upon receiving the actuating signal from the actuator 84 (e.g., via a wired or wireless communication connection), the control assembly 140 powers the motor 120 with power received from the power supply 76 such that the motor 120 drives the motor shaft 124 in the first or opening direction. As a result, the gear train 130 urges the output shaft 134 and the pinion 94 in the door-opening direction, thereby urging the door 74 toward its open position. In certain embodiments, the torque supplied by the powered opening module 100 is sufficient to drive the door 74 toward its open position against the closing force supplied by the closer 90. In other embodiments, the module 100 may merely provide a powered assist that aids the user in manually opening the door 74. In certain embodiments, the control assembly 140 may operate the motor 120 for a predetermined period of time after receiving the actuating signal. Additionally or alternatively, the control assembly 140 may operate the motor 120 until information generated by the position sensor 144 indicates that the door 74 has reached a desired position (e.g., the open position). When operation of the motor 120 ceases, the door 74 may return to its closed position under the urging of the conventional door closer 90.

In the illustrated form, the actuator 84 is external to the powered opening module 100. In such forms, the actuator 84 may sense the user and/or the user's intent to open the door 74 directly, for example by detecting the user, the user's gestures, or the user's activation of a pushbutton. It is also contemplated that the actuator 84 may sense the user's intent to open the door 74 in another manner. For example, the actuator 84 may be provided within the powered opening module, and may infer the user's intent to open the door 74 in response to an initial movement of the door 74 toward its open position. In response to detecting such initial movement of the door 74 (e.g., via the position sensor 144), the control assembly 140 may operate the motor 120 to provide the user with a powered opening assist.

Figure 4:
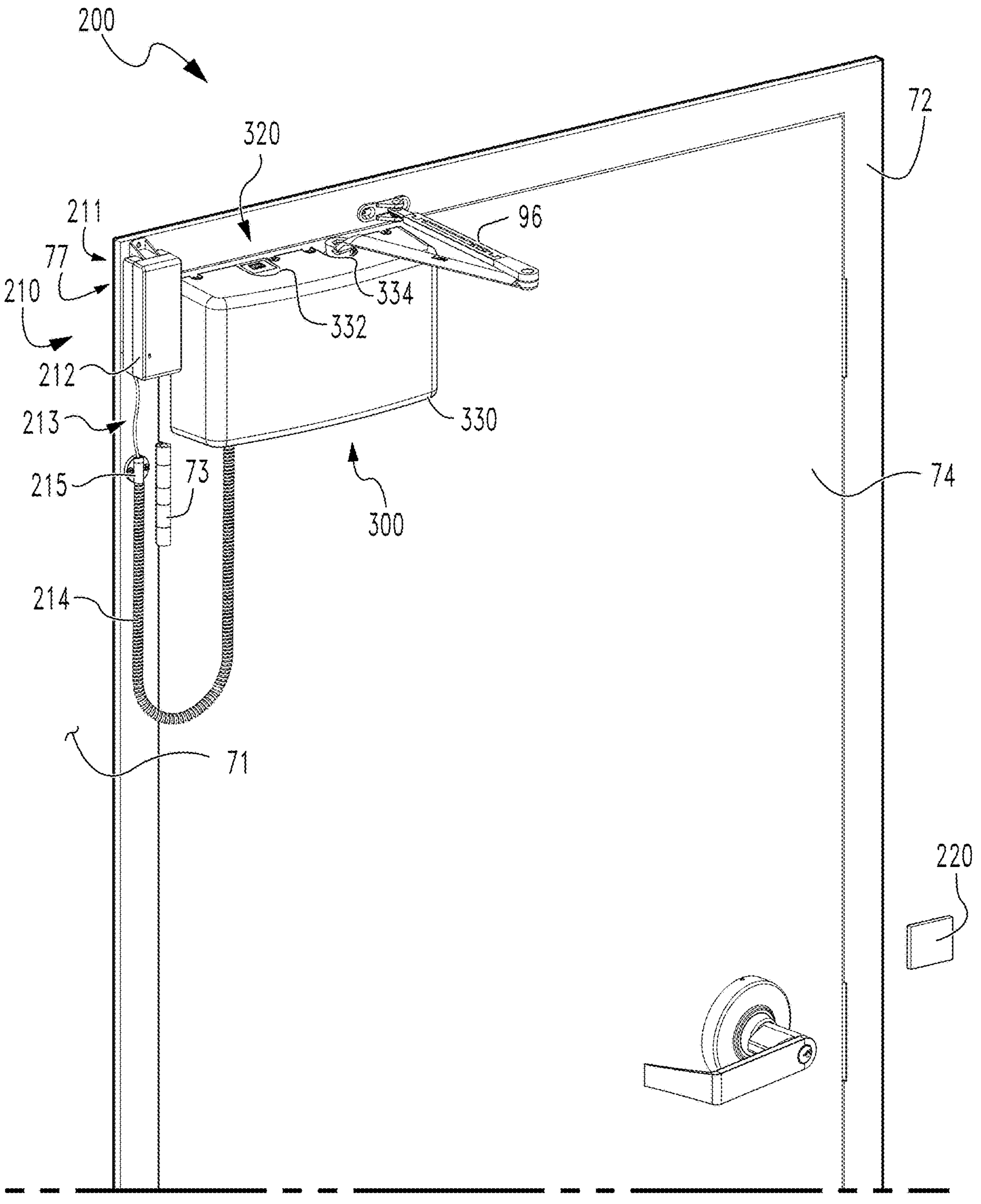
FIG. 4 is a perspective view of a closure assembly according to certain embodiments.

With additional reference to FIG. 4, illustrated therein is a closure assembly 200 according to certain embodiments. The closure assembly 200 is somewhat similar to the above-described closure assembly 70, and generally includes the door frame 72 and the door 74, which is swingingly mounted to the frame 72 by one or more hinges 73. The closure assembly 200 further includes a power transfer assembly 210, an actuator 220, and a door operator assembly 300 according to certain embodiments. As described herein, the door operator assembly 300 is operable to open the door 74 using line power transmitted via the power transfer assembly 210 in response to receiving an actuating signal from the actuator 220.

Figure 5:
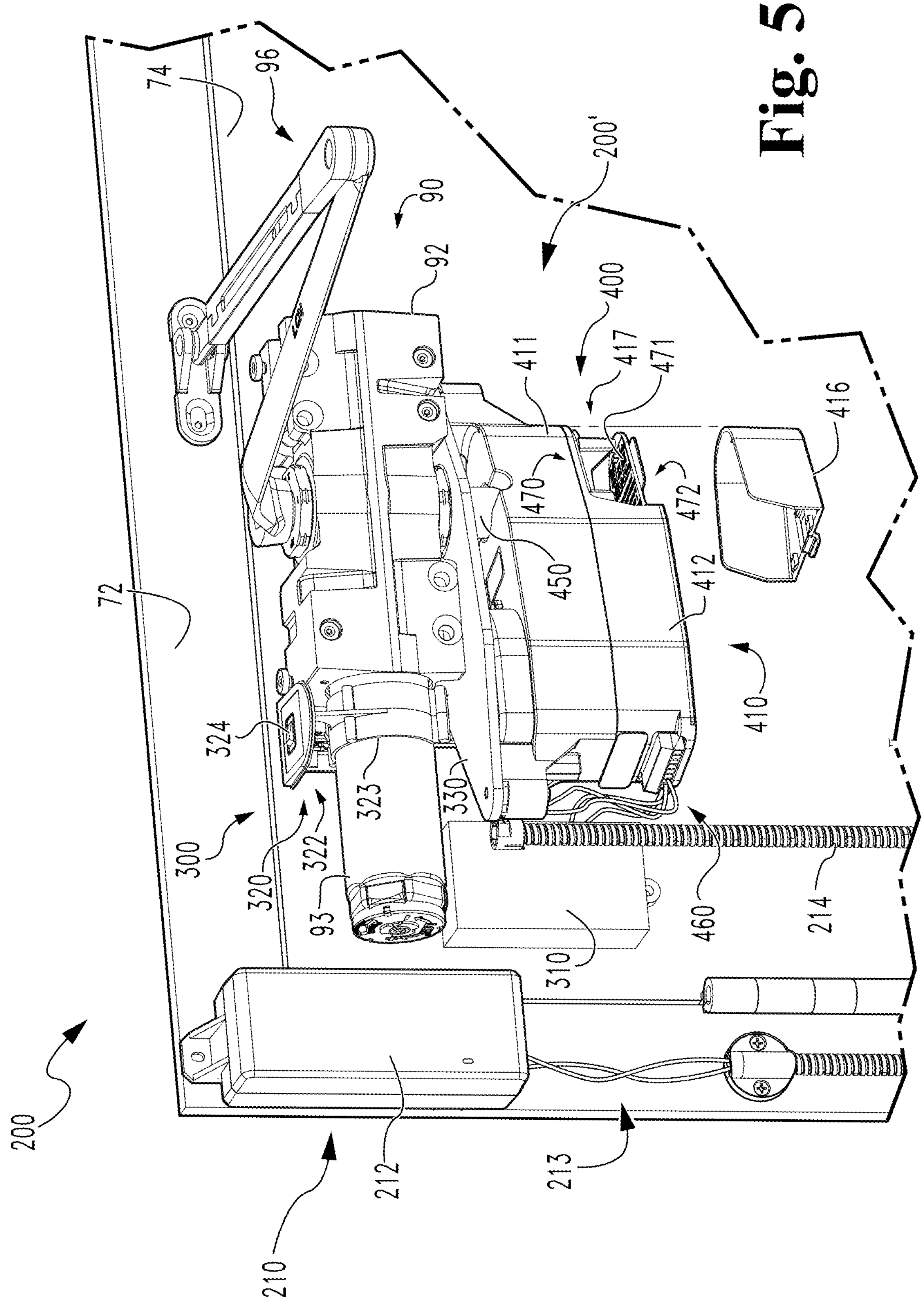
FIG. 5 is a perspective view of a portion of the closure assembly illustrated in FIG. 4.

With additional reference to FIG. 5, the illustrated door operator assembly 300 generally includes the conventional door closer 90, a wireless communication module 310, an override mechanism 320, an adapter plate 330, and a powered opening module 400 according to certain embodiments. As described herein, the powered opening module 400 is operable to at least assist in opening of the door 74 in a manner similar to that described above with reference to the powered opening module 100. The illustrated door operator assembly 300 further includes a hood 340 that encases at least some of the other components of the door operator assembly 300 to discourage tampering with the door operator assembly 300 and/or provide a more pleasing aesthetic to the closure assembly 200. In certain embodiments, such as those in which the door 74 is provided as a glass door, the door operator assembly 300 may further include a back plate that covers the internal components of the door operator assembly 300 so as to obscure such internal components from view from the opposite side of the door 74.

The power transfer assembly 210 generally includes an adapter 212 configured to convert line power to power suitable for use by the door operator assembly 300. For example, the adapter 212 may be configured to convert 120V line power to power of about 24V or less. In the illustrated form, the power transfer assembly 210 includes a standard plug 211 operable to engage a standard electrical outlet 77 in a manner similar to that described above with reference to the plug 104 and the standard outlet 77. For purposes of illustration, the adapter 212 is depicted as including the plug 211, and the outlet 202 is depicted as being provided to the door frame 72. It should be appreciated, however, that the adapter 212 may instead by connected with the plug 211 by a length of wire, and that the outlet 202 may be provided in another location in the vicinity of the door 74. Moreover, it is also contemplated that the power transfer assembly 210 may not necessarily include a plug 211, and that the power transfer assembly 210 may instead be directly wired to line power. However, the provision of a plug-in power transfer assembly 210 operable to plug into a standard power outlet 77 may provide the closure assembly 200 with one or more benefits described herein.

The power transfer assembly 210 further includes a set of power transfer wires 213 and an armored sheath 214 that protects the wires 213. One end of the sheath 214 is coupled with an anchor 215 that is mounted to the frame 72, and the sheath 214 runs into the interior of the hood 340, where the second end of the sheath 214 is anchored. The wires 213 transmit the lower-voltage power from the adapter 212 to the powered opening module 400 and optionally to the wireless communication module 310. While an example form of the power transfer assembly 210 is illustrated, it should be appreciated that other forms of power transfer assembly may be utilized to transmit power to the electronic components of the door operator assembly 300. For example, one of the hinges 73 may be provided in the form of an electrical power transfer ("EPT") hinge.

The actuator 220 is operable to transmit an actuating signal to the powered opening module 400 to cause the door operator assembly 300 to urge the door 74 toward its open position. In the illustrated form, the actuator 220 is configured to transmit a wireless actuating signal, which is transmitted to the powered opening module 400 via the wireless communication module 310. While the illustrated actuator 220 is depicted as being mounted adjacent the door frame 72, it is also contemplated that the actuator 220 may be mounted elsewhere. The actuator 220 may, for example, be provided in any of the locations and in any of the forms described herein with reference to the actuator 84.

Figure 6:
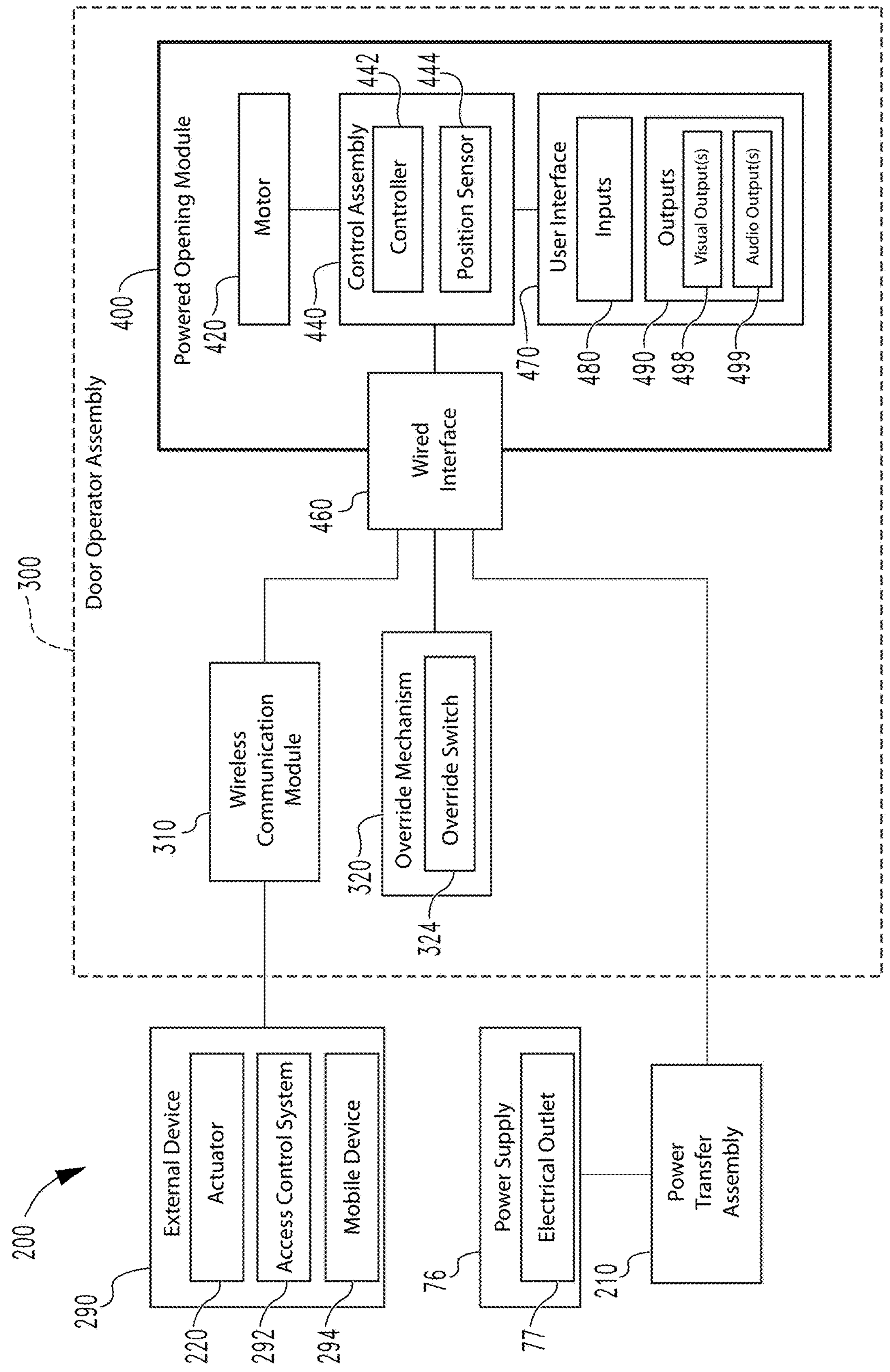
FIG. 6 is a schematic block diagram of the closure assembly illustrated in FIG. 4.

With additional reference to FIG. 6, the wireless communication module 310 may be utilized to facilitate communication between the powered opening module 400 and one or more external devices 290, such as the actuator 220, an access control system 292, a mobile device 294, or another device external to the door operator assembly 300. In the illustrated form, the wireless communication module 310 is an add-on device configured for use with the powered opening module 400. It is also contemplated that the wireless communication module 310 may be integrated into or otherwise provided with the powered opening module 400.

The override mechanism 320 is operable to selectively deactivate the powered opening module 400, and in the illustrated form generally includes a mounting bracket 322 and an override switch 324. The mounting bracket 322 is configured for mounting to the door closer 90, and in the illustrated form includes a C-shaped clip 323 configured for mounting to the tube portion 93 of the closer body 92. It is also contemplated that the bracket 322 may take another form, and may not necessarily include the clip 323. For example, the bracket 322 may instead be configured for mounting to another portion of the closer body 92, or may include an annular ring configured for mounting to the tube portion 93. The override switch 324 is accessible from outside the hood 340, and is configured to selectively prevent operation of the powered opening module 400. While other forms are contemplated, the illustrated override switch 324 is provided in the form of a rocker toggle.

The override switch 324 has an on state and an off state, and is operable to be transitioned between the on state and the off state by a user, such as maintenance personnel and/or an installer. In certain embodiments, the override switch 324 may be manually movable between the on state and the off state, while in other embodiments, the override switch 324 may require the use of a tool to transition between the on state and the off state. When the override switch 324 is in the on state, the powered opening module 400 is operable to exert forces on the door 74 via the closer 90 as described herein. When the override switch 324 is in the off state, the powered opening module 400 is disabled.

Figure 7:
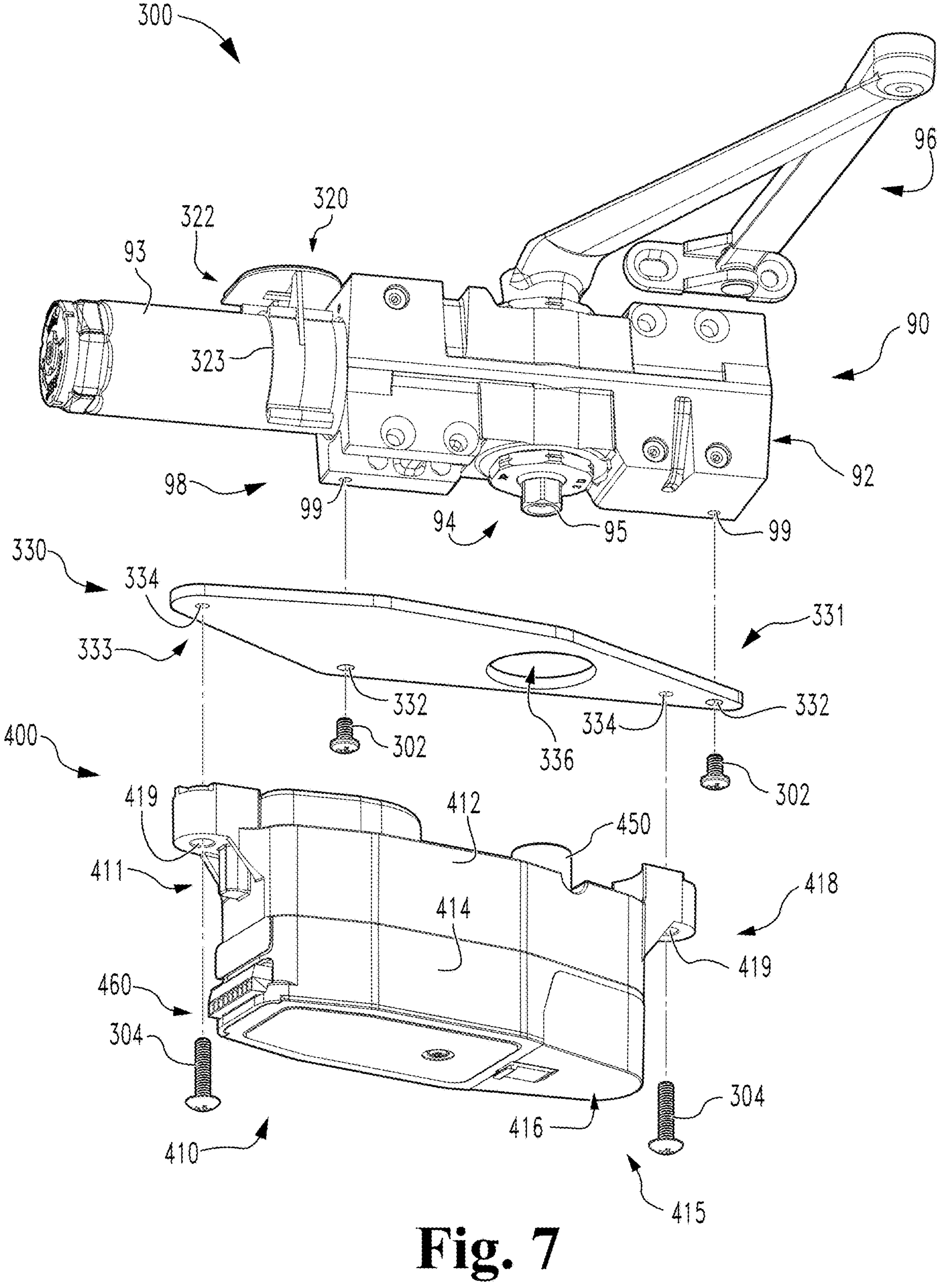
FIG. 7 is a partially-exploded assembly view of a door operator assembly of the closure assembly illustrated in FIG. 4.

With additional reference to FIG. 7, the adapter plate 330 facilitates mounting of the powered opening module 400 to the closer 90, and includes a plurality of mounting apertures that further facilitate such mounting. More particularly, the adapter plate 330 includes a first mounting pattern 331 including at least one first mounting aperture 332, and a second mounting pattern 333 including at least one second mounting aperture 334. The first mounting pattern 331 corresponds to the closer body mounting pattern 98, and facilitates coupling of the adapter plate 330 with the closer body 92 (e.g., via one or more first fasteners 302). The second mounting pattern 333 corresponds to a mounting pattern 418 of a case 410 of the powered opening module 400, and facilitates coupling of the adapter plate 330 with the case 410. The adapter plate 330 is operable to be positioned between the module 400 and the closer body 92 such that each adapter plate first aperture 332 is aligned with a corresponding mounting location 99 while each adapter plate second aperture 334 is aligned with a corresponding case mounting aperture 419 and an opening 336 of the adapter plate 330 is aligned with the pinion 94.

The illustrated adapter plate 330 further includes an opening 336 through which extends one or both of the exposed end portion 95 of the pinion 94 and/or a pinion adapter 450 of the powered opening module 400 such that the exposed end portion 95 is engaged with the pinion adapter 450. In the illustrated form, the adapter plate 330 is mounted to the closer body 92, and the powered opening module 400 is mounted to the adapter plate 330. In other embodiments, the powered opening module 400 may be mounted directly to the closer body 92. However, it has been found that indirectly mounting the powered opening module 400 to the closer body 92 via an adapter plate 330 may provide one or more advantages discussed in further detail below.

The hood 340 is mounted to the door 74 and at least partially encases one or more other components of the door operator assembly 300. The hood 340 includes a first opening 342 through which the override switch 324 is accessible and a second opening 344 through which the armature 96 extends. The hood 340 may be formed of a radio-frequency (RF) passive material, such as plastic, such that the hood 340 does not block the wireless communications between the wireless communication module 310 and the external device 290. It is also contemplated that the hood 340 may be formed of metal, for example in embodiments in which the powered opening module 400 is in wired communication with the external device 290.

Figure 8:
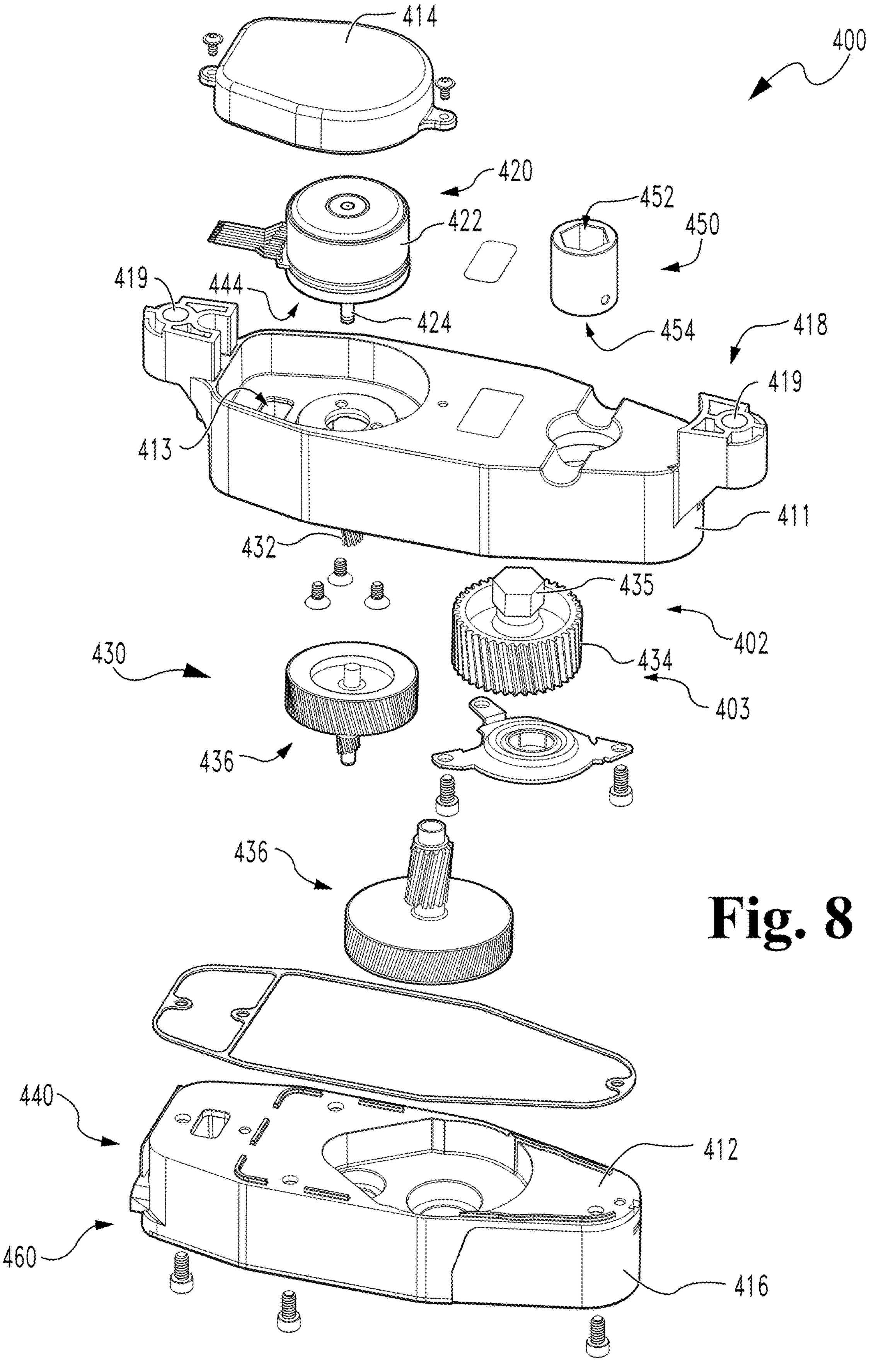
FIG. 8 is an exploded assembly view of a powered opening module of the door operator assembly illustrated in FIG. 7.

With additional reference to FIG. 8, the powered opening module 400 is somewhat similar to the above-described powered opening module 100, and similar reference characters are used to denote similar elements and features. For example, the powered opening module 400 generally includes a case 410, a motor 420, a gear train 430, and a control assembly 440, which respectively correspond to the case 110, motor 120, gear train 130, and control assembly 140 of the powered opening module 100. In the interest of conciseness, the following description of the powered opening module 400 primarily focuses on elements, features, and functions of the module 400 that are different from those described above with reference to the powered opening module 100 illustrated in FIGS. 1-3. As described herein, the illustrated powered opening module 400 further includes a pinion adapter 450 coupled with an output gear of the gear train 430, a wired interface 460 connected with the control assembly 440, and a user interface 470 in communication with the control assembly 440.

The illustrated case 410 generally includes a first case portion 411 and a second case portion 412 coupled to the first case portion 411 such that the gear train 430 is enclosed by first case portion 411 and the second case portion 412. The first case portion 411 includes a receptacle 413 in which the motor 420 is seated, and may further include a motor cover 414 operable to enclose the receptacle 413. The case 410 also includes a user interface cover 416 operable to enclose a receiving space 417 that is defined by the second case portion 412, and which houses the user interface 470. The case 410 also includes a case mounting pattern 418 including at least one case aperture 419 that facilitates coupling of the case 410 to the adapter plate 330, for example via fasteners 304.

The motor 420 is in communication with the control assembly 440 such that the control assembly 440 is operable to control operation of the motor 420. The motor 420 includes a body portion 422 and a shaft 424 that is rotated by the body portion 422 under control of the control assembly 440. The motor shaft 424 is coupled to an input gear 432 of the gear train 430 such that the motor 420 is operable to drive the gear train 430.

The gear train 430 operably connects the motor shaft 424 with the pinion adapter 450. The gear train 430 generally includes an input gear 432 rotationally coupled with the motor shaft 424, and an output gear 434 rotationally coupled with the pinion adapter 450. The gear train 430 may further include one or more intermediate gears 436 through which the input gear 432 is operably connected with the output gear 434. The output gear 434 includes a stem 435 sized and shaped for rotational coupling with an output gear interface 454 of the pinion adapter 450. In certain forms, the output gear 434 may be considered to be included in a shaft portion 403 of an output shaft 402 that further includes the pinion adapter 450.

In the illustrated form, the gear train 430 connects the motor shaft 424 with the pinion adapter 450 such that rotation of either of the motor shaft 424 or the pinion adapter 450 in either direction causes a corresponding rotation of the other of the motor shaft 424 or the pinion adapter 450. As a result, in the illustrated form, closing of the door 74 under the force of the closer 90 back-drives the motor 420. It is also contemplated that the powered opening module 400 may include a clutch mechanism connected at a point between the motor shaft 424 and the pinion 94 such that the closer 90 does not back-drive the motor 420 during closing of the door 74.

The control assembly 440 is substantially similar to the control assembly 140, and generally includes a controller 442 and a position sensor 444 in communication with the controller 442. As described herein, the controller 442 is operable to control operation of the motor 420. Such operation may be based at least in part upon information from the position sensor 444, which is configured to sense the rotational position of at least one component driven by the motor 420. In the illustrated form, the position sensor 444 is provided in the form of a rotary encoder that is associated with the motor shaft 424 such that the position sensor 444 is operable to sense the rotational position of the motor shaft 424. It is also contemplated that the position sensor 444 may be provided in another form (e.g., an inductive rotary position sensor) and/or may be associated with another component driven by the motor 420 (e.g., the pinion adapter 450 and/or one or more gears of the gear train 430).

The pinion adapter 450 is configured to provide an interface between the exposed end portion 95 of the pinion 94 and the output shaft 402. The pinion adapter 450 generally includes a pinion interface 452 configured for rotational coupling with the pinion 94 and an output gear interface 454 configured for rotational coupling with the output gear 434. In the illustrated form, the exposed end portion 95 of the pinion 94 has a hexagonal male geometry, and the pinion interface 452 has a corresponding hexagonal female geometry configured to matingly receive the exposed end portion 95. Similarly, the stem 435 of the output gear 434 has a hexagonal male geometry, and the output gear interface 454 has a corresponding hexagonal female geometry configured to matingly receive the stem 435. It is also contemplated that one or more of the geometries may be different. For example, should the exposed end portion 95 have a D-shaped male geometry, the pinion interface 452 may have a corresponding D-shaped female geometry configured to matingly receive the exposed end portion 95.

In the illustrated form, the pinion adapter 450 and the output gear 434 are separate components that are rotationally coupled with one another. It is also contemplated that the pinion adapter 450 and the output gear 434 may be integrally formed as a single unitary piece. However, it has been found that providing the pinion adapter 450 as a separate component that can be removed from and coupled to the output gear 434 (e.g., at the factory or by an installer) may provide the operator assembly 300 with one or more advantages discussed herein.

Figure 9:
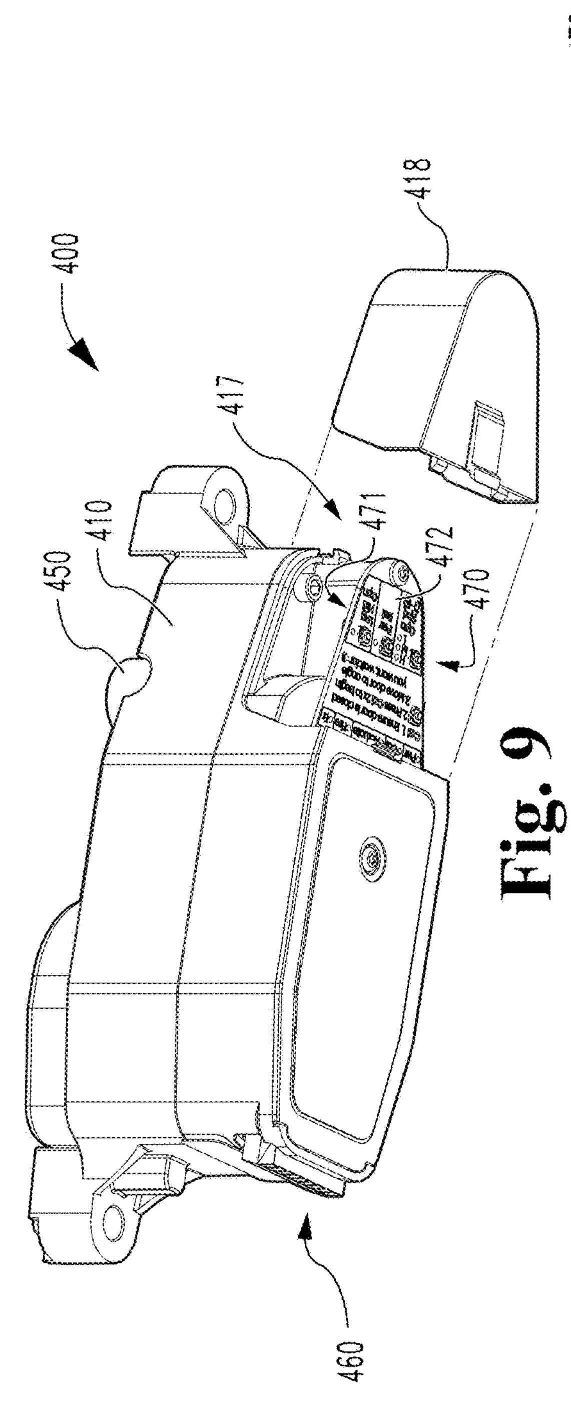
FIG. 9 is a perspective partially-exploded view of the powered opening module illustrated in FIG. 8.
Figure 10:
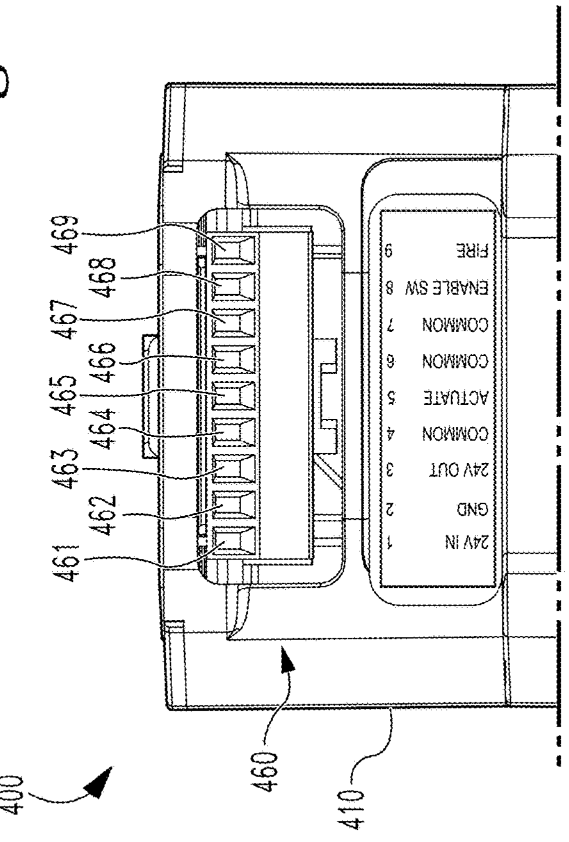
FIG. 10 is a plan view of a portion of the powered opening module illustrated in FIG. 8, and illustrates a wired interface of the powered opening module.

With additional reference to FIGS. 9 and 10, the wired interface 460 is connected with the control assembly 440, and is operable to provide power and electrical signals to the control assembly 440. In the illustrated form, the wired interface 460 includes first through ninth ports 461-469, and indicia identifying the functions of the various ports are provided on the case 410 adjacent the wired interface 460. In the illustrated form, the wired interface 460 is a removable module operable to be inserted into and removed from the case 410, which may facilitate the act of connecting the control assembly 440 to the devices external to the module 400.

A first port 461 is a 24V in port, a second port 462 is a ground port, and a third port 463 is a 24V out port. The wires 213 of the power transfer assembly 210 may be connected with the first through third ports 461-463. The wired interface 460 includes a plurality of common ports (including the fourth port 464, the sixth port 466, and the seventh port 467) connected to a common of the control assembly 440. The fifth port 465 is an actuating port through which the control assembly 440 receives the actuating signal that causes the controller 442 to actuate the motor 420. In the illustrated form, the actuating port 465 is wired to the wireless communication module 310 such that the control assembly 440 is operable to receive the actuating signal from the actuator 220 via the wireless communication module 310 and the actuating port 465. It is also contemplated that the actuating port 465 may be in communication with the actuator 220 via a wholly-wired connection.

The eighth port 468 is wired to the override switch 434 such that the override switch 434 is operable to prevent the control assembly 440 from actuating the motor 420, for example by opening a circuit. The ninth port 469 is a fire port that is also operable to prevent the control assembly 440 from actuating the motor 420, for example in the event of a fire or other emergency that would warrant such prevention. In certain embodiments, a wire from an access control system 292 may be connected with the fire port 469, and cessation of a signal via the fire port 469 may prevent the control assembly 440 from operating the motor 420, for example by opening a circuit. It is also contemplated that the fire port 469 may be connected with one of the common ports 464, 466, 467 via a wire that closes the circuit to enable operation of the motor 420. In such embodiments, melting of the wire (e.g., during a fire emergency) opens the circuit and prevents the door operator assembly 300 from opening the door 74.

Figure 11:
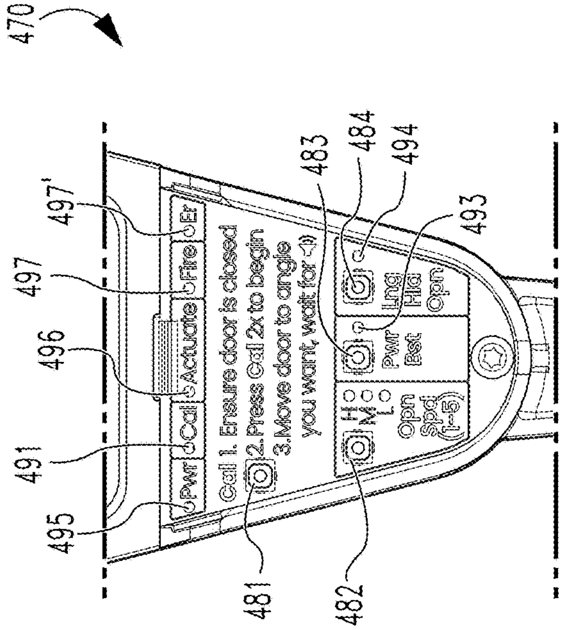
FIG. 11 is a plan view of a portion of the powered opening module illustrated in FIG. 8, and illustrates a user interface of the powered opening module.

With additional reference to FIG. 11, the user interface 470 is connected with the control assembly 440, and is disposed in the receiving space 417 such that the user interface cover 416 is operable to enclose the user interface 470 within the receiving space 417. The user interface 470 is configured to facilitate installation, calibration, maintenance, and/or adjustment of the powered opening module 400, and generally includes one or more inputs 480, one or more outputs 490, and indicia relating to the inputs 480 and/or the outputs 490. The user interface 470 includes a first side 471 and a second side 472 opposite the first side 471. In the illustrated form, the first side 471 and the second side 472 are substantially identical, which may provide one or more advantages described herein. It is also contemplated that the first side 471 and the second side 472 may be different from one another. For example, the inputs 480, outputs 490, and indicia may be disposed only on one of the sides 471, 472, or the sides 471, 472 may include different sets of inputs 480, outputs 490, and indicia.

In the illustrated form, each of the inputs 480 is provided in the form of a tactile input, and more particularly in the form of a depressible button. It is also contemplated that one or more of the inputs 480 may be provided in another form, such as that of a toggle, a DIP switch, a slider, a keypad, or another form of input. The inputs 480 of the illustrated user interface 470 include a calibration input 481, an opening speed input 482, a power boost input 483, and a hold-open input 484, the functions of which are described in detail below.

The illustrated user interface 470 includes outputs 490, and more particularly includes at least one visual output 498 and at least one audible output 499, such as a speaker, beeper, or buzzer. In the illustrated form, each visual output 498 is provided in the form of a visual indicator such as a light. It is also contemplated that one or more visual outputs 498 may be provided in another form, such as a display screen. In the illustrated user interface 470, the visual outputs 498 include a calibration indicator 491, one or more opening speed indicators 492, a power boost indicator 493, and a hold-open indicator 494.

The visual outputs 498 may include a power indicator 495 configured to provide a visual indication when the powered opening module 400 is connected to a power source 76, an actuation indicator 496 configured to provide a visual indication when the powered opening module 400 is operating to open the door 74, a fire indicator 497 configured to provide a visual indication when the powered opening module 400 is inoperable due to presence of a fire condition, and/or an error indicator 497' configured to provide a visual indication when an error has occurred. The user interface 470 may include indicia and/or instructions relating one or more of the visual outputs to the respective functions (e.g., "Pwr" within a box that also encloses the power indicator 495).

In certain embodiments, one or more components of the closure assembly 200 may be provided in a retrofit kit 200' for an existing closure assembly, such as one including an existing door closer 90 that was previously installed to bias a door 74 toward a closed position relative to a door frame 72. In the illustrated form, the retrofit kit 200' includes the power transfer assembly 210, the wireless communication module 310, the override mechanism 320, the adapter plate 330, the hood 340, and the powered opening module 400. It is also contemplated that one or more of these components may be omitted. As one example, the wireless communication module 310 may be omitted in embodiments in which the powered opening module 400 is to be placed in wired communication with the actuator 220, or includes an internal wireless communication device. As another example, the adapter plate 330 may be omitted in certain embodiments, such as those in which the case 410 is configured to be mounted directly to the closer body 92. Moreover, it is to be appreciated that a retrofit kit 200' may include additional components. As one example, the retrofit kit 200' may include an actuator 220 in the event that an actuator was not previously installed to the closure assembly. As another example, a kit may include the conventional door closer 90.

Figure 12:
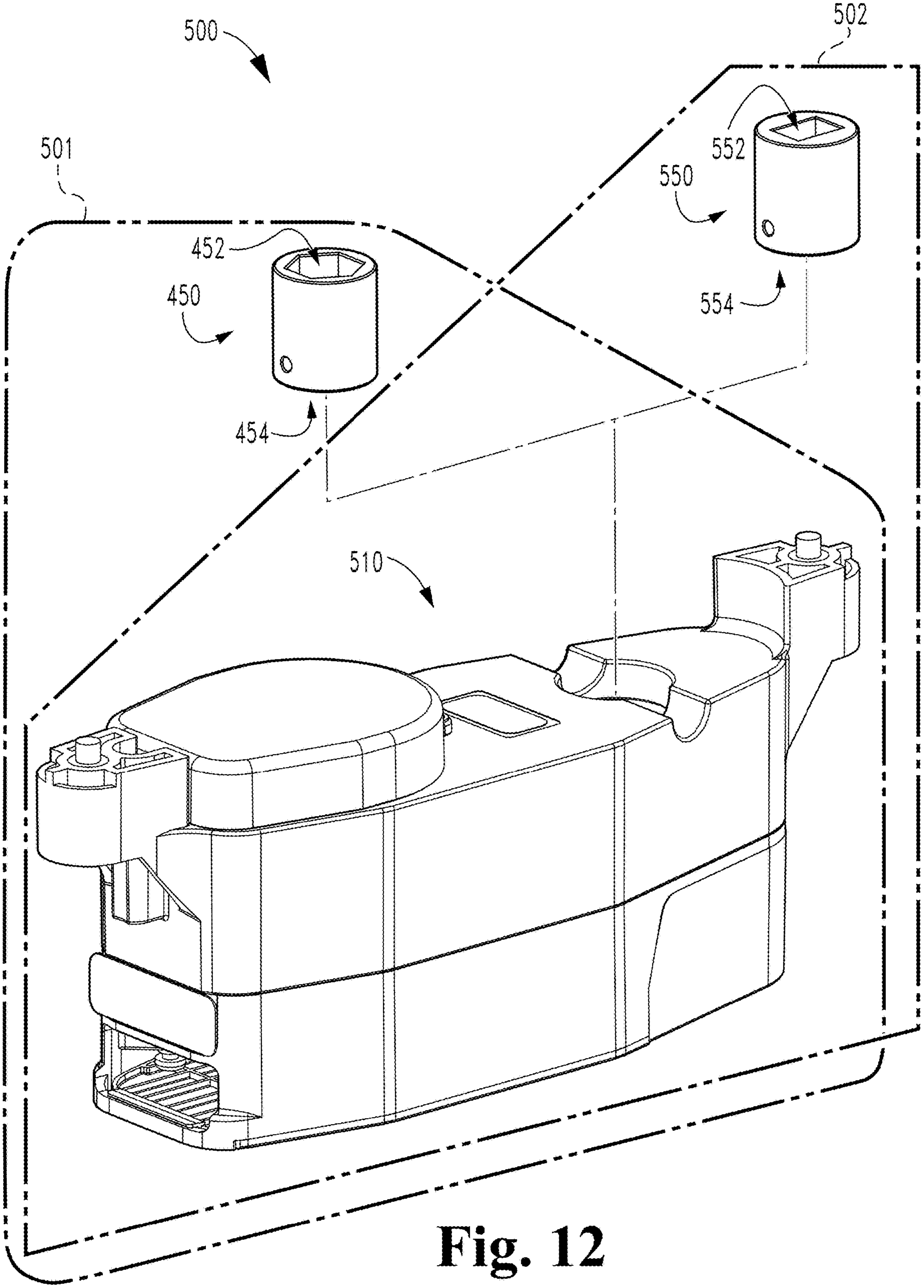
FIG. 12 is a schematic representation of a product line according to certain embodiments.

With additional reference to FIG. 12, illustrated therein is a product line 500 according to certain embodiments. The product line 500 includes a common platform 510, which in the illustrated form includes all components of the powered opening module 400 but for the pinion adapter 450. While the illustrated common platform 510 is illustrated as corresponding to the powered opening module 400, it should be appreciated that the concepts described in connection with the product line 600 may be utilized to produce retrofit modules having more, fewer, or alternative features in comparison to the powered opening module 400. For example, while the illustrated powered opening module 400 is operable to provide both an opening force and a closing force, the retrofit modules 501, 502 produced using the product line 500 may instead be operable to provide only one of a closing force or an opening force.

The product line 500 also includes the pinion adapter 450 and a second pinion adapter 550. The second pinion adapter 550 includes a second pinion interface 552, which has a different geometry as compared to the first pinion interface 452. The second pinion interface 552 is configured to mate with a pinion of a second conventional door closer in which the pinion has an exposed end portion with a second pinion geometry different from the geometry of the exposed end portion 95 of the illustrated pinion 94. While the illustrated second pinion interface 552 is provided with a generally square-shaped geometry, it should be appreciated that the second pinion interface 552 may be provided with another geometry configured to mate with an exposed end portion of the second pinion. The second pinion adapter 550 also includes a second stem interface 554, which, like the first stem interface 454, is configured for rotational coupling with the stem 435. As a result, the second pinion adapter 550 is operable to be rotationally coupled with the output gear 434 to form an output shaft operable to engage the pinion of the second conventional closer.

Due to the fact that each pinion adapter 450, 550 includes a corresponding stem interface 454, 554 configured for rotational coupling with the stem 435, the pinion adapters 450, 550 are interchangeably capable of being mounted to the common platform 510. Thus, the first pinion adapter 450 may be installed to the common platform 510 to prepare a first retrofit module 501 configured for use with the illustrated conventional closer 90, while the second pinion adapter 550 may be installed to the common platform 510 to prepare a second retrofit module 502 configured for use with the second conventional closer. The interchangeability of the pinion adapters 450, 550 may aid in reducing inventory requirements and/or facilitating production of retrofit modules for varying configurations of door closers.

Figure 13:
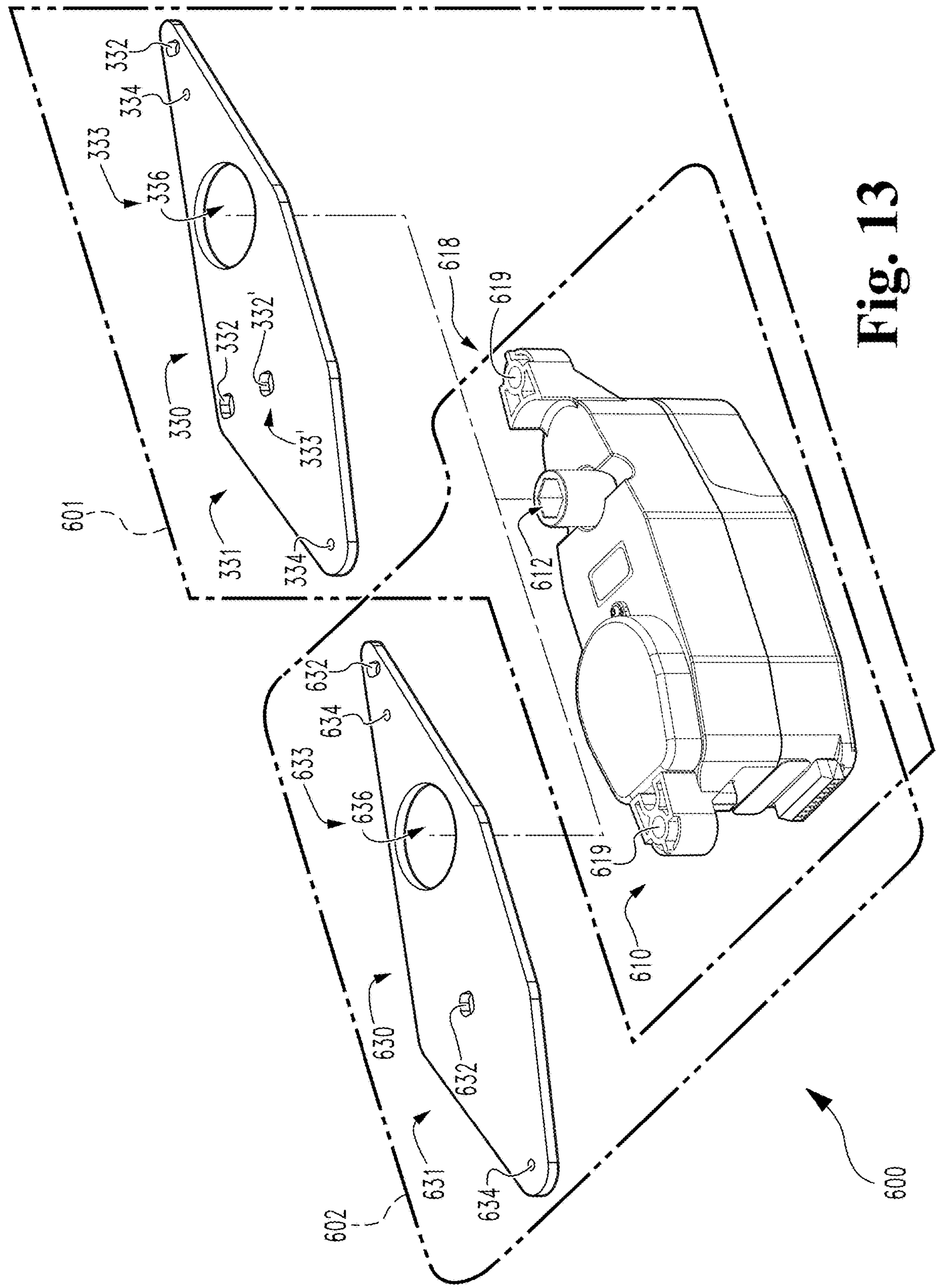
FIG. 13 is a schematic representation of a product line according to certain embodiments.

With additional reference to FIG. 13, illustrated therein is a product line 600 according to certain embodiments. The product line 600 includes a retrofit module 610, which includes a mounting pattern 618 including at least one mounting aperture 619. The retrofit module 610 may, for example, be provided along the lines of the powered opening module 400. It is also contemplated that the retrofit module 610 may have more, fewer, or alternative features in comparison to the powered opening module 400. The product line 600 further includes the adapter plate 330 and a second adapter plate 630, each of which is operable to facilitate mounting of the retrofit module 610 to a corresponding configuration of door closer.

The second adapter plate 630 is configured to facilitate mounting of the retrofit module 610 to a second door closer having a second closer body mounting pattern different from the illustrated closer body mounting pattern 98. The second adapter plate 630 includes a first mounting pattern 631 that corresponds to the second closer body mounting pattern, and which includes at least one second adapter plate first aperture 632. The second adapter plate 630 also includes a second mounting pattern 633 that corresponds to the case mounting pattern 418, and which includes at least one second adapter plate second aperture 634. The second adapter plate 630 also includes an opening 636 operable to receive the pinion of the second door closer while the first mounting pattern 631 is aligned with the closer body mounting pattern of the second door closer. The second adapter plate 630 is operable to be positioned between the retrofit module 610 and the second door closer such that each second adapter plate first aperture 632 is aligned with a corresponding mounting location of the second door closer while each second adapter plate second aperture 634 is aligned with a corresponding mounting aperture 619 and the opening 636 is aligned with the pinion of the second closer and the pinion adapter 612 of the retrofit module 610.

Due to the fact that the second mounting patterns 333, 633 of the adapter plates 330, 630 are the same, the adapter plates 330, 630 are operable to be interchangeably associated with the retrofit module 610. Thus, the product line 600 may be utilized to create each of a first retrofit kit 601 including the first adapter plate 330 and the retrofit module 610, and a second retrofit kit 602 including the second adapter plate 630 and the retrofit module 610. It should be appreciated that the module 610 of the first retrofit kit 601 and the module 610 of the second retrofit kit 602 may include different configurations of pinion adapter 612, for example in embodiments in which the pinion of the first door closer and the pinion of the second door closer have different geometries on the exposed end portions thereof. Moreover, it is also contemplated that an adapter plate 330 may include an additional mounting pattern 333' including at least one additional mounting aperture 332'. The additional mounting pattern 333' may be configured to match the closer mounting pattern of another type of door closer such that the same adapter plate 330 is configured for use with multiple forms of door closers.

Figure 14:
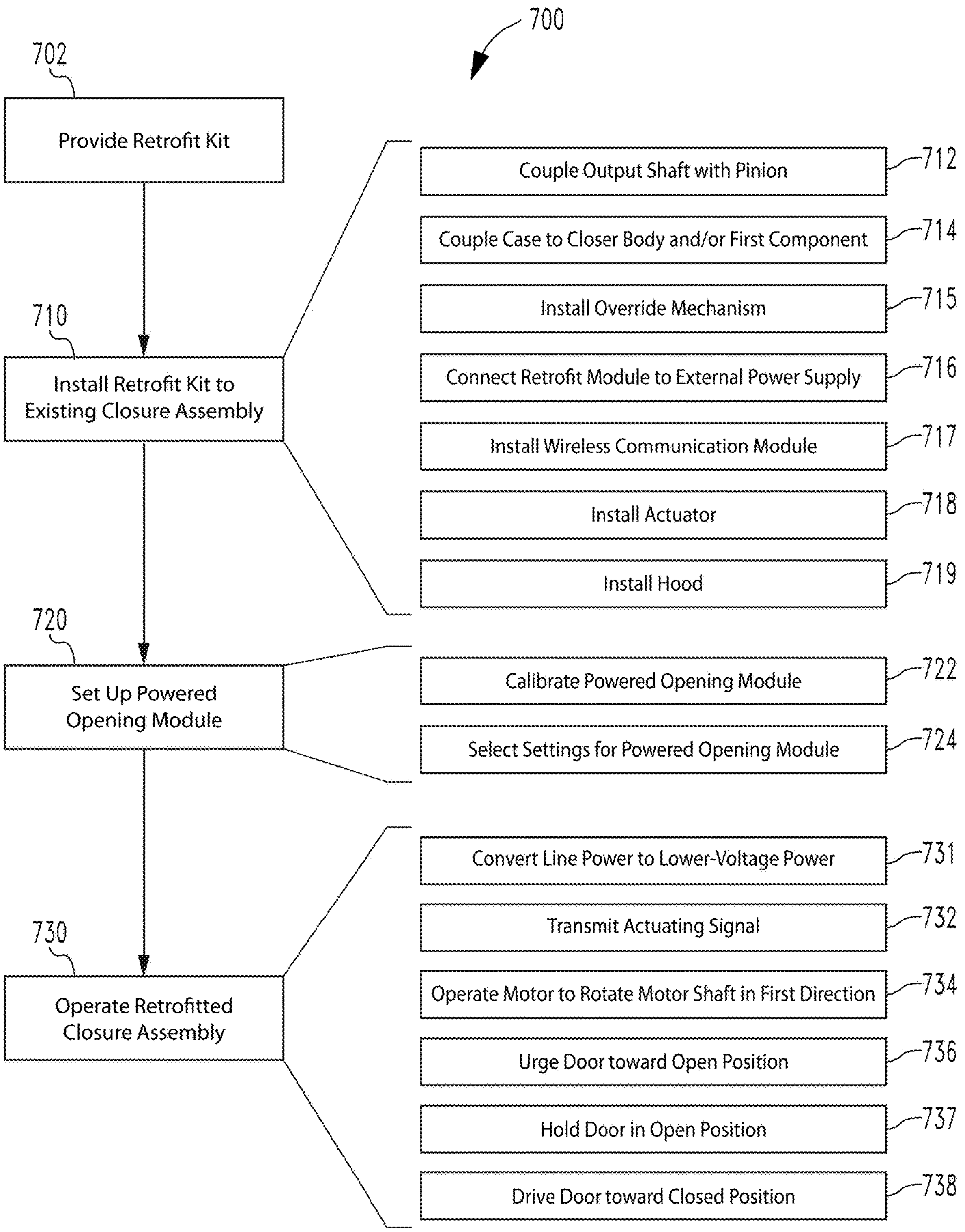
FIG. 14 is a schematic flow diagram of a process according to certain embodiments.

With additional reference to FIG. 14, an exemplary process 700 that may be performed using the powered opening module 100 is illustrated. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another. Moreover, while the process 700 is initially described herein with specific reference to the powered opening module 100 illustrated in FIGS. 1-3, it is to be appreciated that the process 700 may be performed with powered opening modules having additional or alternative features. As described herein, for example, certain embodiments of the process 700 may be performed using the powered opening module 400 and/or the associated retrofit kit 200' illustrated in FIGS. 4-11.

The process 700 may begin with block 702, which generally involves providing a retrofit kit configured for installation to an existing closure assembly. In certain embodiments, block 702 may involve providing the retrofit kit 100', which includes a retrofit powered opening module 100, and which may further include an actuator 84. As noted above, the retrofit powered opening module 100 generally includes a case 110, an output shaft 134 rotatably mounted in the case 110, a motor 120 mounted in the case 110 and operable to rotate the output shaft 134, and a control assembly 140 configured to cause the motor 120 to urge the output shaft 134 in a first rotational direction in response to receiving an actuating signal.

The process 700 generally includes an installation procedure 710 and an operation procedure 730, and may further include a set-up procedure 720 prior to the operation procedure 730. As described herein, the installation procedure 710 generally involves installing a retrofit kit to an existing closure assembly, the set-up procedure 720 generally involves setting up a powered opening module of the installed retrofit kit, and the operation procedure 730 generally involves operating the retrofitted closure assembly.

As noted above, the installation procedure 710 generally involves installing a retrofit kit 100' to an existing closure assembly. The illustrated retrofit kit 100' generally includes the retrofit powered opening module 100, and may further include the actuator 84. The existing closure assembly is provided in a static structure, and generally includes a first component, a second component, and a door closer 90 connected between the first component and the second component. The first component may be provided as one of the door frame 72 or the door 74, and the second component may be provided as the other of the door frame 72 or the door 74. The door closer 90 generally includes a closer body 92 mounted to the first component, a pinion 94 rotatably mounted to the closer body 92, and an armature 96 connected between the pinion 94 and the second component such that the pinion 94 rotates in the door-closing direction during movement of the door 74 from the open position toward the closed position and rotates in the door-opening direction during movement of the door 74 from the closed position toward the open position. In the illustrated form, the first component (to which the closer body 92 is mounted) is provided as the door 74, and the second component (between which and the pinion 94 the armature 96 is connected) is provided as the door frame 72. It is also contemplated that this arrangement may be reversed such that the closer body 92 is mounted to the door frame 72 and the armature 96 is connected between the pinion 94 and the door 74.

The installation procedure 710 includes block 712, which generally involves coupling the output shaft 134 with the pinion 94 such that rotation of the output shaft 134 in the first rotational direction is correlated with rotation of the pinion 94 in the door-opening direction. In the illustrated form, block 712 involves inserting the exposed end portion 95 of the pinion 94 into the pinion interface 135 of the output shaft 134 such that the pinion 94 and the output shaft 134 are coupled for joint rotation. It is also contemplated that the output shaft 134 may be engaged with the pinion 94 via one or more intermediate components, such as gears, adapters, or other elements.

The installation procedure 710 further includes block 714, which generally involves coupling the case 110 to at least one of the closer body 92 or the first component. In the illustrated form, block 714 involves coupling the case 110 to the closer body 92 with one or more fasteners 101 such as bolts. Additionally or alternatively, block 714 may involve securing the case 110 to the first component (e.g., the door 74).

The installation procedure 710 may further include block 716, which generally involves connecting the retrofit module 100 with an external power supply 76. In certain embodiments, the retrofit kit 100' may include a cord 102 having a plug 104 configured for connection with an electrical outlet 77 near the closure assembly 70. In such forms, block 716 may involve engaging the plug 104 with the electrical outlet 77 such that the retrofit module 100 is operable to receive line power. As noted above, the cord 102 may include an adapter 103 that converts the line power to a lower-voltage power having a lower voltage than the line power.

In certain embodiments, such as those in which the retrofit kit 100' includes an actuator 84 external to the module 100, the installation procedure 710 may further include block 718, which generally involves installing the actuator 84. More particularly, block 718 may involve mounting the actuator 84 to one of the closure assembly 70 or a wall 71 adjacent the closure assembly 70. In certain embodiments, block 718 may involve mounting the actuator 84 to the wall 71 such that the actuator 84 is positioned in the vicinity of the door 74 (e.g., less than six feet from the door 74). In certain embodiments, block 718 may involve mounting the actuator 84 to the door frame 72. In certain embodiments, block 718 may involve mounting the actuator 84 to the door 74. In certain embodiments, block 718 may involve mounting the actuator 84 at a height that facilitates manual actuation, such as between 34 and 48 inches above floor level. It is also contemplated that the actuator 84 may be mounted at a height that facilitates actuation by foot, such as less than 24 inches above floor level.

Block 718 may further involve placing the actuator 84 in communication with the control assembly 140. In certain embodiments, placing the actuator 84 in communication with the control assembly 140 may involve forming a wired connection between the actuator 84 and the control assembly 140. In certain embodiments, placing the actuator 84 in communication with the control assembly 140 may involve providing the actuator 84 with the ability to wirelessly communicate the actuating signal to the control assembly 140.

It is to be appreciated that the installation procedure 710 may include additional or alternative steps or blocks not specifically illustrated in FIG. 14. For example, should the existing closer 90 be mounted to the door 74 via screws, it may be desirable to replace the screws with larger bolts to ensure that the closer body 92 does not separate from the door under the opening forces generated by the module 100. Additionally or alternatively, it may be desirable to adjust the spring size setting of the closer 90 to a size setting conducive for use with the module 100, and/or adjust the hydraulic regulation valves to settings conducive for use with the module 100.

As noted above, certain embodiments of the process 700 may involve a set-up procedure 720, which generally involves setting up the installed retrofit module 100. The set-up procedure 720 may include block 722, which generally involves calibrating the powered opening module 100. For example, block 722 may involve causing the module 100 to enter a calibration mode while the door 74 is in the closed position, and then opening the door 74 to a desired open position. During calibration, the controller 142 may note the information provided by the position sensor 144 while the door 74 is in the closed position, and then note the information provided by the position sensor 144 while the door is in the desired open position. This positional information can then be used during subsequent operation of the closure assembly 70 as described herein. Further details regarding an example calibration operation are provided below.

In addition or as an alternative to the calibration of block 722, the set-up procedure 720 may include block 724, which generally involves selecting one or more options and/or operating characteristics for the operation of the closure assembly 70. Further details regarding example operations that may be associated with block 724 are provided below.

With the installation of the retrofit kit 100' and set-up of the powered opening module 100 complete, the process 700 may continue to the operation procedure 730, which generally involves operating the retrofitted closure assembly 70. The operation procedure 730 may involve block 731, which generally involves converting line power from a higher voltage received from the power supply 76 to a lower voltage for use by the module 100 and/or the actuator 84. For example, block 731 may be performed by the adapter 103 to convert the line power to power of about 24 volts or less. As should be appreciated, block 731 may be performed throughout the performance of the operation procedure 730 such that the retrofit powered opening module 100 remains constantly powered.

The operation procedure 730 may include block 732, which generally involves transmitting the actuating signal from the actuator 84 to the control assembly 140 in response to detecting a user. Block 732 may be performed at least in part by the actuator 84. In certain embodiments, the actuator 84 may detect the user without being touched by the user. In certain embodiments, the actuator 84 may detect the user when physically acted upon by the user. In certain embodiments, the actuator 84 may transmit the actuating signal via a wired connection. In certain embodiments, the actuator 84 may transmit the actuating signal wirelessly.

The operation procedure 730 further includes block 734, which generally involves operating the motor 120 in response to receiving the actuating signal. Block 734 may be performed at least in part by the control assembly 140, and may involve providing the motor 120 with electrical power that causes the motor 120 to rotate the motor shaft 124 in the first direction corresponding to opening of the door 74. In certain embodiments, block 734 may involve operating the motor 120 for a predetermined period of time. In certain embodiments, block 734 may involve operating the motor 120 until information from the position sensor 144 indicates that the door 74 has reached its desired position (e.g., the open position).

The operation procedure 730 further includes block 736, which generally involves urging the door 74 toward its open position as a result of the torque applied by the motor 120 to the motor shaft 124. In the illustrated form, the reduction gear set or gear train 130 urges the output shaft 134 to rotate in the door-opening direction as the motor 120 drives the motor shaft 124 in the first direction. As a result, the output shaft 134 urges the pinion 94 to rotate in the door-opening direction, thereby urging the door 74 toward its open position. In the illustrated embodiment, the torque supplied by the motor 120 is sufficient to move the door 74 toward its open position without manual assistance from the user. In other embodiments, the torque supplied by the motor 120 may merely assist the manual opening of the door 74 by the user.

In certain embodiments, block 736 involves limiting the force exerted on the door 74 and/or the power drawn by the powered opening module 100 to a corresponding threshold value. As one example, block 736 may involve limiting the torque supplied by the motor 120 to prevent the door 74 from exerting greater than a threshold force (e.g., fifteen pounds of force) on objects (e.g., obstacles and/or users) within the swing path of the door 74. This may involve limiting the torque supplied by the motor based on information received from the position sensor 144, as the leverage may change based on door position due to the changing configuration of the armature 96. Additionally or alternatively, block 736 may involve limiting the current drawn by the motor 736 to ensure that the power requirements for the power supply 76 remain below a threshold value, such as 48 Watts.

In certain embodiments, the operation procedure 730 may involve block 737, which generally involves holding the door 74 in the open position. For example, block 737 may involve operating the motor 120 to hold the output shaft 134 in a particular position, such as one corresponding to a fully-open position of the door 74. Such a hold-open operation may, for example, be performed for a predetermined period of time after the motor 120 has been operated to urge or drive the door 74 toward its fully open position.

In certain embodiments, the operation procedure 730 may include block 738, which generally involves operating the motor 120 to urge the door 74 toward its closed position. For example, block 738 may involve supplying the motor 120 with an electrical power that causes the motor 120 to rotate the motor shaft 124 in a second direction opposite the first direction. As will be appreciated, such rotation of the motor shaft 124 in the second direction causes the output shaft 134 to drive the pinion 94 in the door-closing direction, thereby urging the door 74 toward its closed position. In certain embodiments, block 738 may be performed when information from the position sensor 144 indicates that the door 74 is traveling toward its closed position and has reached an intermediate position between the open position and the closed position. It is also contemplated that the door 74 may be driven to its closed position by the internal biasing forces of the door closer 90 without assistance from the module 100.

It should be evident from the foregoing that the retrofit module 100 and/or the retrofit kit 100' may present certain advantages over existing devices. As one example, the retrofit module 100 and/or the retrofit kit 100' may be installed to existing closure assemblies in which a door closer 90 has previously been installed to provide the closure assembly 70 with the capability of at least assisting in the opening of the door 74. Due to the fact that the existing closer 90 is being reused, the cost of upgrading an existing closure assembly to a door-opening closure assembly 70 may be reduced in comparison to replacing the door closer 90 with a new door-opening operator. Moreover, in embodiments in which the module 100 is configured to be plugged into an electrical outlet 77, the need for a skilled electrician to hardwire the module 100 to line power is obviated, thereby facilitating installation.

As noted above, certain embodiments of the process 700 may be performed using a retrofit kit along the lines of the retrofit kit 200' illustrated in FIGS. 4-11. Further details regarding an example implementation of the process 700 using the retrofit kit 200' will now be provided. In the interest of conciseness, the following description of the process 700 as it relates to the retrofit kit 200' focuses primarily on acts and features not specifically described above with reference to the embodiment of the process 700 involving the retrofit kit 100' illustrated in FIGS. 1-3. It should be understood, however, that certain descriptions relating to one embodiment of the process 700 (e.g., an embodiment involving one of the retrofit kit 100' or the retrofit kit 200') may be equally applicable to another embodiment of the process 700 (e.g., an embodiment involving the other of the retrofit kit 100' or the retrofit kit 200').

Block 702 generally involves providing a retrofit kit, and in the current embodiment involves providing the retrofit kit 200', which includes at least a retrofit module configured for installation to an existing closure assembly. In certain forms, the retrofit kit provided in block 702 includes the powered opening module 400 illustrated in FIGS. 4-11. As noted above, the powered opening module 400 generally includes a case 410, an output shaft 402 rotatably mounted in the case 410, a motor 420 mounted in the case 410 and operable to rotate the output shaft 402, and a control assembly 440 configured to cause the motor 420 to urge the output shaft 402 in a first rotational direction in response to receiving an actuating signal. As described herein, the retrofit kit provided in block 702 may further include one or more additional components configured for use with the existing closure assembly, such as the power transfer assembly 210, the actuator 220, the wireless communication module 310, the override mechanism 320, the adapter plate 330, and/or the hood 340.

The installation procedure 710 generally involves installing the retrofit kit 200' to the existing closure assembly. In block 712, the output shaft 402 is coupled with the pinion 94 by engaging the exposed end portion 95 with the pinion interface 452 of the pinion adapter 450. As will be appreciated, the configuration of the pinion adapter 450 may be selected based upon the configuration of the door closer 90 to which the module 400 is to be installed, and more particularly upon the geometry of the exposed end portion 95 of the pinion 94 of the door closer 90. For example, should the exposed end portion 95 have a generally hexagonal geometry, the pinion adapter 450 may be selected with a corresponding hexagonal geometry. Should the exposed end portion 95 have a different geometry, such as a generally square-shaped geometry or a generally D-shaped geometry, the pinion adapter 450 may be selected with a corresponding mating geometry. In certain embodiments, the configuration of the pinion adapter 450 may be selected by the user at the time of purchase, and installed to the module 400 in a factory setting such that the module 400 is provided to the installer with the pinion adapter 450 already installed. In certain embodiments, the retrofit kit 200' may include plural pinion adapters (e.g., the pinion adapter 450 and the pinion adapter 550), and the correct pinion adapter may be selected and installed after sale, such as at the time of installation to the closure assembly.

Block 714 generally involves coupling the case 410 to the closer body 92 and/or the first component, and in the currently-discussed embodiment involves coupling the case 410 to the closer body 92 via an adapter plate 330 of the retrofit kit 200'. More particularly, block 714 involves securing the adapter plate 330 to the closer body 92 and securing the module 400 to the adapter plate 330. In certain embodiments, block 714 may begin by placing the adapter plate 330 against the closer body 92 in a position in which the exposed end portion 95 extends through the opening 336 and the first mounting pattern 331 aligns with the closer body mounting pattern 98, and securing the adapter plate 330 to the closer body 92 in such a position using one or more first fasteners 302. In such forms, block 714 may then involve placing the module 400 in a position in which the exposed end portion 95 engages the pinion adapter 450 and the case mounting pattern 418 aligns with the second mounting pattern 333 (e.g., by performing block 712), and securing the module 400 to the adapter plate 330 in such a position using one or more second fasteners 304. It is also contemplated that the module 400 may first be secured to the adapter plate 330, and that the adapter plate 330 may then be secured to the closer body 92.

It should be appreciated that the configuration of the adapter plate 330 may be selected based upon the configuration of the door closer 90 to which the module 400 is to be installed, and more particularly upon the configuration of the mounting pattern 98 that will be utilized to secure the adapter plate 330 to the closer body 92. In certain embodiments, the configuration of the adapter plate 330 may be selected by the user at the time of purchase, and provided with the module 400 in the retrofit kit 200'. In certain embodiments, the retrofit kit 200' may include plural adapter plates (e.g., the adapter plate 330 and the adapter plate 630), and the correct adapter plate may be selected and installed at the time of installation to the closure assembly. In certain embodiments, the adapter plate provided in the retrofit kit 200' may include an additional mounting pattern 333' such that the same adapter plate 330 is configured for use with plural forms of closers having different closer mounting patterns.

In certain forms, such as those in which the retrofit kit 200' includes an override mechanism 320, the installation procedure 710 may include block 715, which generally involves installing such an override mechanism 320. In the illustrated form, block 715 involves mounting the bracket 322 to the closer body 92, for example by engaging the C-shaped clip 323 with the tubular portion 93 of the closer body 92. Block 715 further includes placing the override switch 324 in communication with the control assembly

440, for example by attaching one or more wires of the override mechanism 320 to the corresponding ports of the wired interface 460. Block 715 may further involve placing the switch 324 in its off state such that the module 400 remains inactive for the remainder of the installation procedure 710, which may facilitate the installation.

Block 716 involves connecting the retrofit module 400 to the power supply 76. For example, block 716 may involve attaching the power transfer wires 213 to the appropriate ports of the wired interface 460, and plugging the plug 211 into a standard electrical outlet 77. Block 716 may further involve securing the anchor 215 to the door frame 72 or the wall 71 adjacent the frame 72. As will be appreciated, certain portions of block 716, such as the plugging in of the plug 211 to the outlet 77, may be reserved for the end of the installation procedure 710 such that the module 400 remains unpowered for the duration of the installation.

In certain embodiments, such as those in which the retrofit kit 200' includes a wireless communication module 310 separate from the powered opening module 400, the installation procedure 710 may include block 717, which generally involves installing such a wireless communication module 310. In certain forms, block 717 may involve adhering the wireless communication module 310 to the door 74 in an area that will be covered by the hood 340 to obscure the wireless communication module 310 from view. Block 717 further includes placing the wireless communication module 310 in communication with the control assembly 440, for example by connecting one or more wires of the module 310 with the appropriate port(s) of the wired interface 460.

In certain embodiments, such as those in which the retrofit kit 200' includes an actuator 220 external to the module 400, the installation procedure 710 may further include block 718, which generally involves installing the actuator 220, for example as described above with reference to the installation of the actuator 84.

In certain embodiments, such as those in which the retrofit kit 200' includes a hood 340, the installation procedure 710 may include block 719, which generally involves installing such a hood 340. More particularly, block 719 involves mounting the hood 340 to the first component (which in the illustrated embodiment is the door 74) such that the override switch 324 is accessible via the opening 332 and the armature 96 extends through the opening 334.

It should be appreciated that the installation procedure 710 may include one or more actions not specifically illustrated in FIG. 14. For example, in embodiments in which the door 74 is formed of glass, the retrofit kit 200' may include a back plate as noted above, and the installation procedure 710 may include installing such a back plate to hide the components within the hood 340 from being viewed from the opposite side of the door 74. Installation of such a back plate may, for example, occur prior to the installation of the wireless communication module 310 such that block 717 involves mounting the wireless communication module 310 to the back plate. Additionally or alternatively, the installation procedure 710 may involve placing the override switch 324 in its on state to activate the powered opening module 400 in preparation for the set-up procedure 720 and/or the operation procedure 730.

As noted above, various blocks of the installation procedure 710 may involve placing the control assembly 440 in communication with one or more components external to the module 400. For example, blocks 715, 716, and 717 involve connecting wires to corresponding ports of the wired interface 460. In the illustrated form, the wired interface 460 is removably mounted to the module 400 such that the ports 461-469 are connected with the circuitry of the control assembly 440 when the wired interface 460 is mounted to the module 400. Thus, one or more of the wires may be attached to the corresponding port(s) while the modular wired interface 460 is removed from the module 400, and may be electrically connected with the circuitry of the control assembly 440 by insertion of the wired interface 460 into a corresponding receptacle formed in the housing 410.

In certain forms, the process 700 may involve the set-up procedure 720, which generally involves setting up the powered opening module 400 for use in the operation procedure 730. The set-up procedure 720 may include block 722, which generally involves calibrating the powered opening module 400. Block 722 may begin with the door 74 in its closed position, and may be initiated by operating the calibration input 481 of the user interface 470. While other modes of initiation are contemplated, in the illustrated form, block 722 involves pressing the button of the calibration input 481 twice to initiate a calibration procedure. The calibration indicator 791 may be activated to provide feedback to the installer that the calibration procedure has commenced. With the door 74 in the closed position, the controller 442 takes note of the positional information transmitted by the position sensor 444, and correlates this information with the closed position of the door 74.

Block 722 may further involve the installer manually moving the door 74 to the open position to which it is desired that the module 400 move the door 74 in response to the actuating signal. As will be appreciated, this movement of the door 74 causes a corresponding rotation of the pinion 94 and the pinion adapter 450, thereby causing rotation of the component with which the position sensor 444 is associated (e.g., the motor shaft 424). The controller 442 notes the position indicated by the position sensor 444 when the door 74 is in the open position. The controller 442 may then provide the installer with feedback that calibration has been completed, and that the door 74 can be released. For example, the controller 442 may cause the audible output 499 to generate a tone when the position information associated with the door open position has been noted.

In certain embodiments, the set-up procedure 720 may include block 724, which generally involves selecting one or more settings or operating characteristics for the powered opening module 400. As one example, block 724 may involve operating the open speed input 482 to select a desired opening speed for the door 74, and the opening speed indicator(s) 492 may provide feedback relating to the selected opening speed. As another example, block 724 may involve operating the power boost input 483 to activate or deactivate a power boost option described herein, and the power boost indicator 493 may indicate whether the power boost option has been selected. As another example, block 724 may involve operating the hold-open input 484 to adjust the duration of a hold-open option described herein, and the hold-open indicator 494 may indicate the selected duration of the hold-open operation.

As noted above, at least some embodiments of the retrofit modules described herein are capable of use with various configurations of door closers. For example, while the illustrated door closer 90 is provided as a door-mounted closer, it is also contemplated that a closer may be mounted to the frame 94 or the wall 71 above the door 74. In such forms, the armature 96 may extend from a lower side of the closer 90, and the exposed end portion 95 may be positioned on the upper side of the closer 90. Thus, while the illustrated embodiment involves installing the module 400 to the lower side of the closer 90, it may be the case that the module 400 is instead installed to the upper side of the closer 90. Depending upon one or more factors (e.g., the side of the closer 90 to which the module is installed and/or the eye-level of the installer relative to the user interface 470), it may be difficult for the installer to view and/or manipulate one side of the user interface 470. In the illustrated form, however, such difficulties are averted by the configuration of the user interface 470, in which the inputs 480 and the outputs 490 are distributed between the first side 471 and the second side 472. Thus, the installer is able to interface with either set of inputs 480 and outputs 490 based on which is most convenient in the current circumstances.

With the retrofit kit 200' installed (e.g., as a result of the installation procedure 710) and the powered opening module 400 set up (e.g., as a result of the set-up procedure 720), the process 700 may continue to the operation procedure 730, which generally involves operating the retrofitted closure assembly 200. It should be appreciated, however, that the operation procedure 730 may be performed in connection with other installation procedures and/or other set-up features, or may be performed as a standalone process.

The illustrated operation procedure 730 includes block 731, which involves converting the line power received from the power supply 76 to lower-voltage power suitable for use by the door operator assembly 300. Block 731 may, for example, be performed at least in part by the adapter 212. As will be appreciated, block 731 may be performed throughout the operation procedure 730 to provide the closure assembly 200 with a constant source of electrical power. Further details regarding the conversion of block 731 are provided above.

The operation procedure 730 further includes block 732, which generally involves transmitting an actuating signal. Block 732 may, for example, be performed by the actuator 220 in response to detecting a user and/or a user's intent to open the door 74. Further details regarding the transmission of block 732 are provided above.

The operation procedure 730 further includes block 734, which generally involves operating the motor 420 to rotate the motor shaft 424 in a first direction. Block 734 may, for example, be performed by the control assembly 440 in response to receiving the actuating signal (e.g., via the wireless communication module 310). As noted above, the operating of block 734 urges the door 74 toward the open position in block 736. Further details regarding the operation of block 734 and the urging of block 736 are provided above.

It should be appreciated that the operating of block 734 may be based at least in part upon one or more criteria provided to the control assembly 440, such as during the set-up procedure 720. As one example, the power provided to the motor 420 may be modulated based upon the opening speed selected via the opening speed input 482. For example, a higher power may be provided to the motor 420 in block 734 when the installer has selected a faster opening speed in block 724, and a lower power may be provided to the motor 420 in block 734 when the installer has selected a lower opening speed in block 724. Moreover, the power may be provided in block 734 until the position information provided by the position sensor 444 corresponds to the set-point value noted in the calibration of block 722.

In certain embodiments, the operation procedure 730 may include block 737, which generally involves holding the door 74 in the open position. Block 737 may, for example, involve providing the motor 420 with a sufficient power to resist the closing force generated by the door closer 90. The holding of block 737 may also be based in part upon one or more operating characteristics selected by the installer in the set-up procedure 720. For example, if the installer selected a short duration for the hold-open operation, block 737 may involve holding the door 74 open for a shorter duration, such as about one second. If the installer selected a long duration for the hold-open operation, block 737 may instead involve holding the door 74 open for a longer duration, such as three to five seconds.

In certain embodiments, the operation procedure 730 may include block 738, which generally involves driving the door 74 toward its closed position. Block 738 may, for example, be performed in the event that the installer selected the power boost option in block 724. In circumstances that involve the power boost option, block 738 generally involves operating the motor 420 to rotate the motor shaft 424 in a second direction opposite the first direction, thereby driving the pinion 94 in the door-closing direction. In certain embodiments, block 738 may be performed for the full duration of the closing of the door 74. In other embodiments, block 738 may be performed only when the position information generated by the position sensor 444 indicates that the door 74 is approaching the closed position and has reached the intermediate position as described above.

Figure 15:
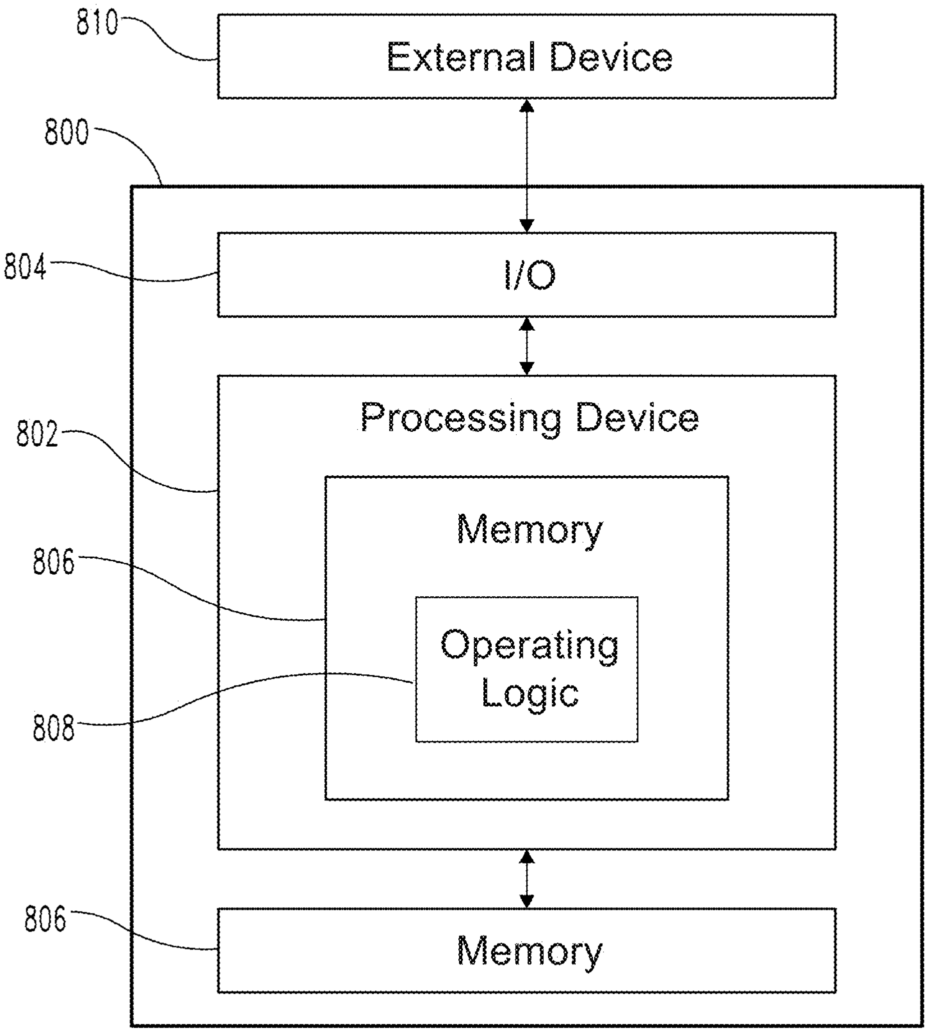
FIG. 15 is a schematic block diagram of a computing device that may be utilized in certain embodiments.

Referring now to FIG. 15, a simplified block diagram of at least one embodiment of a computing device 800 is shown. The illustrative computing device 800 depicts at least one embodiment of a controller that may be utilized in connection with the control assembly 140 and/or the control assembly 440.

Depending on the particular embodiment, the computing device 800 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 800 includes a processing device 802 that executes algorithms and/or processes data in accordance with operating logic 808, an input/output device 804 that enables communication between the computing device 800 and one or more external devices 810, and memory 806 which stores, for example, data received from the external device 810 via the input/output device 804.

The input/output device 804 allows the computing device 800 to communicate with the external device 810. For example, the input/output device 804 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 800. The input/output device 804 may include hardware, software, and/or firmware suitable for performing the techniques described herein.

The external device 810 may be any type of device that allows data to be inputted or outputted from the computing device 800. For example, in various embodiments, the external device 810 may be embodied as the actuator 84/220, the motor 120/420, the position sensor 144/444, the access control system 292, the mobile device 294, the wireless communication module 310, or another component in communication with the controller 142/442. Further, in some embodiments, the external device 810 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 810 may be integrated into the computing device 800.

The processing device 802 may be embodied as any type of processor(s) capable of performing the functions described herein. In particular, the processing device 802 may be embodied as one or more single or multi-core processors, microcontrollers, or other processor or processing/controlling circuits. For example, in some embodiments, the processing device 802 may include or be embodied as an arithmetic logic unit (ALU), central processing unit (CPU), digital signal processor (DSP), and/or another suitable processor(s). The processing device 802 may be a programmable type, a dedicated hardwired state machine, or a combination thereof. Processing devices 802 with multiple processing units may utilize distributed, pipelined, and/or parallel processing in various embodiments. Further, the processing device 802 may be dedicated to performance of just the operations described herein, or may be utilized in one or more additional applications. In the illustrative embodiment, the processing device 802 is of a programmable variety that executes algorithms and/or processes data in accordance with operating logic 808 as defined by programming instructions (such as software or firmware) stored in memory 806. Additionally or alternatively, the operating logic 808 for processing device 802 may be at least partially defined by hardwired logic or other hardware. Further, the processing device 802 may include one or more components of any type suitable to process the signals received from input/output device 804 or from other components or devices and to provide desired output signals. Such components may include digital circuitry, analog circuitry, or a combination thereof.

The memory 806 may be of one or more types of non-transitory computer-readable media, such as a solid-state memory, electromagnetic memory, optical memory, or a combination thereof. Furthermore, the memory 806 may be volatile and/or nonvolatile and, in some embodiments, some or all of the memory 806 may be of a portable variety, such as a disk, tape, memory stick, cartridge, and/or other suitable portable memory. In operation, the memory 806 may store various data and software used during operation of the computing device 800 such as operating systems, applications, programs, libraries, and drivers. It should be appreciated that the memory 806 may store data that is manipulated by the operating logic 808 of processing device 802, such as, for example, data representative of signals received from and/or sent to the input/output device 804 in addition to or in lieu of storing programming instructions defining operating logic 808. As illustrated, the memory 806 may be included with the processing device 802 and/or coupled to the processing device 802 depending on the particular embodiment. For example, in some embodiments, the processing device 802, the memory 806, and/or other components of the computing device 800 may form a portion of a system-on-a-chip (SoC) and be incorporated on a single integrated circuit chip.

In some embodiments, various components of the computing device 800 (e.g., the processing device 802 and the memory 806) may be communicatively coupled via an input/output subsystem, which may be embodied as circuitry and/or components to facilitate input/output operations with the processing device 802, the memory 806, and other components of the computing device 800. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 800 may include other or additional components, such as those commonly found in a typical computing device (e.g., various input/output devices and/or other components), in other embodiments. It should be further appreciated that one or more of the components of the computing device 800 described herein may be distributed across multiple computing devices. In other words, the techniques described herein may be employed by a computing system that includes one or more computing devices. Additionally, although only a single processing device 802, I/O device 804, and memory 806 are illustratively shown in FIG. 15, it should be appreciated that a particular computing device 800 may include multiple processing devices 802, I/O devices 804, and/or memories 806 in other embodiments. Further, in some embodiments, more than one external device 810 may be in communication with the computing device 800.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:

providing a retrofit module comprising a case and a shaft rotatably mounted to the case;

selecting, from a first retrofit component and a second retrofit component, a selected retrofit component configured for coupling with a door closer component of a door closer, wherein the door closer comprises a closer body and a pinion rotatably mounted to the closer body, wherein the door closer component has one of a first door closer component configuration or a second door closer component configuration different from the first door closer component configuration, and wherein the selecting comprises:

in response to a determination that the door closer component has the first door closer component configuration, selecting the first retrofit component as the selected retrofit component; and in response to a determination that the door closer component has the second door closer component configuration, selecting the second retrofit component as the selected retrofit component;

wherein the first retrofit component is configured for coupling with the first door closer component configuration;

wherein the second retrofit component is configured for coupling with the second door closer component configuration; and wherein each of the first retrofit component and the second retrofit component is further configured for coupling with a module component of the retrofit module; and providing a retrofit kit configured for use with the door closer, the retrofit kit comprising the retrofit module and the selected retrofit component.

2. The method of claim 1, wherein the door closer component comprises the pinion;

wherein the first retrofit component comprises a first pinion adapter;

wherein the second retrofit component comprises a second pinion adapter; and wherein the module component comprises the shaft.

3. The method of claim 2, wherein the first door closer component configuration comprises a first pinion geometry; and wherein the second door closer component configuration comprises a second pinion geometry different from the first pinion geometry.

4. The method of claim 1, wherein the door closer component comprises the closer body;

wherein the first retrofit component comprises a first adapter plate;

wherein the second retrofit component comprises a second adapter plate; and wherein the module component comprises the case.

5. The method of claim 4, wherein the wherein the first door closer component configuration comprises a first closer body mounting pattern; and wherein the second door closer component configuration comprises a second closer body mounting pattern different from the first closer body mounting pattern.

6. The method of claim 1, further comprising coupling the selected retrofit component to the module component;

wherein providing the retrofit kit comprises providing the retrofit kit with the selected retrofit component coupled to the module component.

7. The method of claim 1, further comprising modifying the door closer with the retrofit kit, the modifying comprising coupling the selected retrofit component to each of the door closer component and the module component.

8. The method of claim 1, further comprising providing a second retrofit kit configured for use with a second door closer comprising a second door closer component having the other of the first door closer component configuration or the second door closer component configuration;

wherein preparing the second retrofit kit comprises selecting, from the first retrofit component and the second retrofit component, a second selected retrofit component different from the selected retrofit component; and wherein the second retrofit kit comprises the second selected retrofit component and a second of the retrofit module.

9. A method, comprising:

providing a platform comprising a case and a shaft rotatably mounted to the case;

selecting, from a first pinion adapter and a second pinion adapter, a selected pinion adapter configured for rotational coupling with a pinion of a door closer that further comprises a closer body to which the pinion is rotatably mounted, wherein the pinion has one of a first pinion geometry or a second pinion geometry different from the first pinion geometry, and wherein the selecting comprises:

in response to a determination that the pinion has the first pinion geometry, selecting the first pinion adapter as the selected pinion adapter; and in response to a determination that the pinion has the second pinion geometry, selecting the second pinion adapter as the selected pinion adapter;

wherein the first pinion adapter is configured for rotational coupling with the first pinion geometry;

wherein the second pinion adapter is configured for rotational coupling with the second pinion geometry; and wherein each of the first pinion adapter and the second pinion adapter is further configured for rotational coupling with the shaft; and providing a retrofit kit configured for use with the door closer, the retrofit kit comprising the platform and the selected pinion adapter.

10. The method of claim 9, further comprising assembling a retrofit module configured for use with the door closer, wherein assembling the retrofit module comprises rotationally coupling the selected pinion adapter with the shaft, thereby facilitating rotational coupling of the shaft with the pinion.

11. The method of claim 10, wherein the retrofit kit comprises the assembled retrofit module.

12. The method of claim 10, further comprising installing the assembled retrofit module to the door closer, the installing comprising rotationally coupling the selected pinion adapter with the pinion to thereby rotationally couple the pinion and the shaft.

13. The method of claim 12, wherein the method further comprises, with the assembled retrofit module installed to the door closer, selectively operating a motor to thereby rotate the shaft; and wherein rotation of the shaft causes a corresponding rotation of the pinion.

14. The method of claim 12, wherein the installing is performed while the door closer is installed to a closure assembly comprising a door operable to be closed by the door closer.

15. The method of claim 9, wherein the platform further comprises a motor operable to rotate the shaft such that the motor is operable to rotate the selected pinion adapter upon rotational coupling of the selected pinion adapter with the shaft.

16. The method of claim 9, further comprising providing a second retrofit kit configured for use with a second door closer comprising a second closer body and a second pinion rotatably mounted to the second closer body, wherein the second pinion has the other of the first pinion geometry or the second pinion geometry;

wherein preparing the second retrofit kit comprises selecting, from the first pinion adapter and the second pinion adapter, a second selected pinion adapter different from the selected pinion adapter; and wherein the second retrofit kit comprises the second selected pinion adapter and a second of the platform.

17. A method, comprising:

providing a retrofit module comprising a case and a shaft rotatably mounted to the case, wherein the case comprises a case mounting pattern;

selecting, from a first adapter plate and a second adapter plate, a selected adapter plate configured for mounting to a closer body of a door closer that further comprises a pinion rotatably mounted to the closer body, wherein the closer body comprises one of a first closer body mounting pattern or a second closer body mounting pattern different from the first closer body mounting pattern, and wherein the selecting comprises:

in response to a determination that the closer body comprises the first closer body mounting pattern, selecting the first adapter plate as the selected adapter plate; and in response to a determination that the closer body comprises the second closer body mounting pattern, selecting the second adapter plate as the selected adapter plate; and wherein the first adapter plate comprises a first adapter plate mounting pattern configured to align with the first closer body mounting pattern;

wherein the second adapter plate comprises a second adapter plate mounting pattern configured to align with the second case mounting pattern; and wherein each of the first adapter plate and the second adapter plate comprises a corresponding additional mounting pattern configured to align with the case mounting pattern; and providing a retrofit kit configured for use with the door closer, the retrofit kit comprising the retrofit module and the selected adapter plate.

18. The method of claim 17, further comprising:

positioning the selected adapter plate between the case and the closer body;

coupling the selected adapter plate to the case; and coupling the selected adapter plate to the closer body.

19. The method of claim 18, wherein positioning the selected adapter plate between the case and the closer body comprises aligning the adapter plate mounting pattern of the selected adapter plate with the one of the first closer body mounting pattern or the second closer body mounting pattern, and aligning the additional adapter plate mounting pattern of the selected adapter plate with the case mounting pattern;

wherein coupling the selected adapter plate to the case comprises fastening the selected adapter plate to the case via a first fastener that engages each of the case mounting pattern and the additional adapter plate mounting pattern of the selected adapter plate; and wherein coupling the selected adapter plate to the closer body comprises fastening the selected adapter plate to the case via a second fastener that engages each of (a) the adapter plate mounting pattern of the selected adapter plate and (b) the one of the first closer body mounting pattern or the second closer body mounting pattern.

20. The method of claim 17, further comprising providing a second retrofit kit configured for use with a second door closer comprising a second closer body and a second pinion rotatably mounted to the second closer body, wherein the second closer body comprises the other of the first closer body mounting pattern or the second closer body mounting pattern;

wherein preparing the second retrofit kit comprises selecting, from the first adapter plate and the second adapter plate, a second selected adapter plate different from the selected adapter plate; and wherein the second retrofit kit comprises the second selected adapter plate and a second of the retrofit kit.

* * * * *